United States Patent
Choi et al.

(10) Patent No.: US 9,007,550 B2
(45) Date of Patent: Apr. 14, 2015

(54) DISPLAY DEVICE AND MANUFACTURING METHOD THEREOF

(71) Applicant: Samsung Display Co., Ltd., Yongin, Gyeonggi-Do (KR)

(72) Inventors: Nak Cho Choi, Hwaseong-si (KR); Yeun Tae Kim, Suwon-si (KR)

(73) Assignee: Samsung Display Co., Ltd. (KR)

( * ) Notice: Subject to any disclaimer, the term of this patent is extended or adjusted under 35 U.S.C. 154(b) by 45 days.

(21) Appl. No.: 13/652,028

(22) Filed: Oct. 15, 2012

(65) Prior Publication Data

US 2013/0286312 A1 Oct. 31, 2013

(30) Foreign Application Priority Data

Apr. 27, 2012 (KR) .......................... 10-2012-0044845

(51) Int. Cl.
*G02F 1/1335* (2006.01)
*G02F 1/1333* (2006.01)
*G02F 1/1339* (2006.01)
*G02F 1/1343* (2006.01)
*G02F 1/136* (2006.01)

(52) U.S. Cl.
CPC .......... *G02F 1/136* (2013.01); *G02F 1/133345* (2013.01); *G02F 1/133371* (2013.01); *G02F 1/134363* (2013.01); *G02F 2202/02* (2013.01)

(58) Field of Classification Search
USPC .................. 349/122, 138, 106–109, 155–158
See application file for complete search history.

(56) References Cited

U.S. PATENT DOCUMENTS

| | | | |
|---|---|---|---|
| 5,831,704 A * | 11/1998 | Yamada et al. | 349/124 |
| 6,449,024 B1 * | 9/2002 | Hirakata et al. | 349/86 |
| 6,520,821 B1 | 2/2003 | Ishii et al. | |
| 6,661,445 B2 | 12/2003 | Mashimo et al. | |
| 6,912,038 B2 | 6/2005 | Liao et al. | |
| 7,554,426 B2 | 6/2009 | Lee et al. | |
| 2001/0004279 A1 * | 6/2001 | Sako et al. | 349/158 |

(Continued)

FOREIGN PATENT DOCUMENTS

| | | |
|---|---|---|
| JP | 2002-350860 A | 12/2002 |
| KR | 10-2003-0063656 A | 7/2003 |

(Continued)

OTHER PUBLICATIONS

Jiwon Sohn et al., "15.1: A Novel VA Architecture for Improved Response Time", SID 06 Digest, 2006, pp. 1063-1066, Yongin-City, Gyeonggi-Do, Korea.

*Primary Examiner* — Charles Chang
(74) *Attorney, Agent, or Firm* — Innovation Counsel LLP

(57) ABSTRACT

Provided are a display device capable of reducing a weight, a thickness, a cost, and a process time and having a durable structure, and a manufacturing method thereof. The display device includes: a substrate including a plurality of pixel areas; a thin film transistor formed on substrate; a first electrode connected to the thin film transistor to be formed in the pixel area; an organic layer formed on the first electrode so as to be connected along the adjacent pixel areas in a first direction among the pixel areas; a space positioned on the first electrode, of which parts of the upper surface and the side are surrounded by the organic layer; a liquid crystal formed to fill the space; and an overcoat formed to cover the rest side of the space which is not covered by the organic layer, in which a height of the upper surface of the organic layer is gradually lowered toward both edges of the pixel area from the center of the pixel area.

17 Claims, 24 Drawing Sheets

(56) References Cited

U.S. PATENT DOCUMENTS

| | | |
|---|---|---|
| 2008/0203907 A1 | 8/2008 | Lee et al. |
| 2011/0101953 A1 | 5/2011 | Cheng et al. |

FOREIGN PATENT DOCUMENTS

| | | |
|---|---|---|
| KR | 10-0414819 | 12/2003 |
| KR | 10-0487361 | 4/2005 |
| KR | 10-2007-0004310 A | 1/2007 |
| KR | 10-2007-0017817 A | 2/2007 |
| KR | 10-2007-0033228 A | 3/2007 |
| KR | 10-2007-0036415 A | 4/2007 |
| KR | 10-2008-0061675 A | 7/2008 |
| KR | 10-2011-0012432 A | 2/2011 |
| KR | 10-2011-0109049 A | 10/2011 |

* cited by examiner

DISPLAY DEVICE AND MANUFACTURING METHOD THEREOF

CROSS-REFERENCE TO RELATED APPLICATION

This application claims priority to and the benefit of Korean Patent Application No. 10-2012-0044845 filed in the Korean Intellectual Property Office on Apr. 27, 2012, the entire contents of which are incorporated herein by reference.

BACKGROUND OF THE INVENTION (a) Field of the Invention

The present invention relates to a display device and a manufacturing method thereof, and more particularly, to a display device having a substantially durable structure and a manufacturing method thereof.

(b) Description of the Related Art

A liquid crystal display, which is one of the most common types of flat panel displays currently in use, typically includes two panels with field generating electrodes, such as a pixel electrode and a common electrode, and a liquid crystal layer interposed therebetween. The liquid crystal display generates electric fields in the liquid crystal layer by applying voltage to the field generating electrodes, with the direction(s) of liquid crystal molecules of the liquid crystal layer being determined by the generated electric field, thereby controlling polarization of incident light so as to display images.

The two panels may include a thin film transistor array panel and an opposite panel. The thin film transistor array panel may include a gate line configured for transferring a gate signal, a data line crossing the gate line and configured for transferring a data signal, a thin film transistor connected with the gate line and the data line, a pixel electrode connected with the thin film transistor, and one or more other components. A light blocking member, a color filter, a common electrode, and one or more other components may be disposed at the opposite panel. In some cases, the light blocking member, the color filter, and the common electrode may be disposed at the thin film transistor array panel.

Since a conventional liquid crystal display device typically requires the aforementioned two panels and the aforementioned constituent elements associated with the two panels, the liquid crystal display device may be undesirably heavy, may be undesirably thick, may require undesirably high manufacturing costs, and may require undesirably long manufacturing time.

The above information disclosed in this Background section is only for enhancement of understanding of the background of the invention. The Background may contain information that does not form the prior art, which is already known in this country to a person of ordinary skill in the art.

SUMMARY OF THE INVENTION

An embodiment of the present invention is related to a display device that includes a substrate, a pixel electrode overlapping the substrate, a common electrode overlapping the pixel electrode, and an organic layer overlapping the common electrode. The organic layer may include a first surface (e.g., an upper surface) and a second surface (e.g., a lower surface). The second surface may be disposed between the first surface and the substrate. The first surface may include a first portion (e.g., a center portion and/or ridge portion) and a second portion (e.g., an edge portion or a valley portion). A distance between the first portion and the substrate in a direction perpendicular to the substrate may be greater than a distance between the second portion and the substrate.

The first surface may be slanted with respect to the substrate to form a substantially robust structure of the organic layer that can effectively withstand pressure. Given the substantially robust structure of the organic layer, the display device may require only a minimum amount of enforcement or protection parts. Advantageously, the manufacturing cost, the manufacturing time, and/or the thickness of the display device may be minimized.

In one or more embodiments, the second portion may be disposed at an angle with respect to the substrate. The angle being greater than or equal to 1 degree and being less than or equal to 10 degrees.

In one or more embodiments, the first surface may further include a third portion (e.g., an intermediate portion) disposed between the first portion and the second portion. The distance between the first portion and the substrate may be greater than a distance between the third portion and the substrate. The distance between the third portion and the substrate may be greater than the distance between the second portion and the substrate. The distance between the first surface and the substrate may gradually decrease from the first portion to the second portion.

In one or more embodiments, the first surface further includes a third portion (e.g., another edge portion or another valley portion). The first portion may be disposed between the second portion and the third portion. The distance between the first portion and the substrate may be greater than a distance between the third portion and the substrate.

In one or more embodiments, the first portion may overlap a center portion of the pixel electrode.

In one or more embodiments, the pixel electrode may include a stem and a plurality of branches; the stem may overlap the first portion.

In one or more embodiments, the display device may further include a set of liquid crystal material. The first portion may overlap a center portion of the set of liquid crystal material. The second portion may overlap an edge portion of the set of liquid crystal material.

In one or more embodiments, the second surface may include a third portion (e.g., a center portion) and a fourth portion (e.g., an edge portion). The third portion may be aligned with the first portion. The fourth portion may be aligned with the second portion. A distance between the third portion and the substrate in the direction perpendicular to the substrate may be greater than a distance between the fourth portion and the substrate. In one or more embodiments, the fourth portion may be disposed at an angle with respect to the substrate; the angle may be greater than or equal to 1 degree and may be less than or equal to 10 degrees.

In one or more embodiments, the display device may include a color filter overlapping the common electrode. The color filter may include a third surface (e.g., an upper surface) and a fourth surface (e.g., a lower surface). The fourth surface may be disposed between the third surface and the substrate. The third surface may include a third portion and a fourth portion. The third portion may be aligned with the first portion. The fourth portion may be aligned with the second portion. A distance between the third portion and the substrate in the direction perpendicular to the substrate may be greater than a distance between the fourth portion and the substrate.

In one or more embodiments, the pixel electrode may include a third surface (e.g., an upper surface) and a fourth surface (e.g., a lower surface). The fourth surface may be disposed between the third surface and the substrate. The third surface may include a third portion and a fourth portion.

The third portion may be aligned with the first portion. A distance between the third portion and the substrate in the direction perpendicular to the substrate may be greater than a distance between the fourth portion and the substrate. In one or more embodiments, the fourth surface may include a fifth portion and a sixth portion. A distance between the fifth portion and the substrate in the direction perpendicular to the substrate may be greater than a distance between the sixth portion and the substrate.

In one or more embodiments, the organic layer may be configured to filter light for displaying a predetermined color. The predetermined color may be one of red, green, blue, cyan, magenta, and yellow. In one or more embodiments, the display device may include a light blocking member. The second portion may be disposed between the light blocking member and the first portion. In one or more embodiments, the second surface may include a third portion and a fourth portion. A distance between the third portion and the substrate in the direction perpendicular to the substrate may be greater than a distance between the fourth portion and the substrate.

In one or more embodiments, the pixel electrode may include a first stem and a second stem that is perpendicular to the first stem. Each of the first stem and the second stem may overlap the first portion.

An embodiment of the invention is related to a method for manufacturing a display device. The method may include forming a pixel electrode that overlaps a substrate. The method may further include forming a common electrode that overlaps the common electrode. The method may further include forming an organic layer that overlaps the common electrode. The organic layer may include a first surface (e.g., an upper surface) and a second surface (e.g., a lower surface). The second surface may be disposed between the first surface and the substrate. The first surface may include a first portion (e.g., a center portion and/or ridge portion) and a second portion (e.g., an edge portion or a valley portion). A distance between the first portion and the substrate in a direction perpendicular to the substrate may be greater than a distance between the second portion and the substrate.

In one or more embodiments, the forming the organic layer may include using a mask for shaping a set of organic material. The mask may include a first transmissive portion, a second transmissive portion, and a third transmissive portion, each being configured to transmit light. The first transmissive portion may be positioned between the second transmissive portion and the third transmissive portion. Each of the second transmissive portion and the third transmissive portion may be wider than the first transmissive portion, for providing a higher etching rate.

In one or more embodiments, the method may include aligning the first transmissive portion with a center portion of the set of organic material.

In one or more embodiments, the method may include aligning the first transmissive portion with a center portion of the pixel electrode.

One or more embodiments of the present invention may be related a display device having advantages of minimum weight, thickness, cost, and manufacturing time. One or more embodiments of the invention may be related to a method for manufacturing the display device.

One or more embodiments of the present invention may be related to a display device having a durable structure that can withstand external pressure. One or more embodiments of the invention may be related to a method for manufacturing the display device.

An embodiment of the present invention is related to a display device. The display device may include a substrate including a plurality of pixel areas. The display device may further include a thin film transistor formed on the substrate. The display device may further include a pixel electrode connected to the thin film transistor to be formed in the pixel area. The display device may further include an organic layer formed on the pixel electrode so as to be connected along the adjacent pixel areas in a first direction among the pixel areas. The display device may further include a space positioned on the pixel electrode, of which the upper surface and a part of the side are surrounded by the organic layer. The display device may further include a liquid crystal formed to fill the space. The display device may further include and an overcoat formed to cover the rest of the sides of the space which is not covered by the organic layer, in which a height of the upper surface of the organic layer is gradually lowered toward both edges of the pixel area from the center of the pixel area.

The display device may further include a common electrode formed to be spaced apart from the pixel electrode, in which the common electrode may be formed to cover the upper surface and a part of the side of the space, and be connected along the adjacent pixel areas in the first direction among the pixel areas.

The display device may further include a common electrode formed to be spaced apart from the pixel electrode, in which the common electrode may be formed below the space, and the pixel electrode and the common electrode may have rod shapes, and the plurality of pixel electrodes and common electrodes may be alternately arranged in one pixel area.

The overcoat may be formed to cover the entire surface on the substrate and may seal the space for each pixel area.

The upper surface of the organic layer and the substrate may be gradually closer toward both edges of the pixel area from the center of the pixel area.

An angle between the substrate and the upper surface of the organic layer is 1 degree or more and 10 degrees or less.

An angle between the substrate and the upper surface of the organic layer may be 1.5 degrees or more and 2 degrees or less.

The display device may further include a color filter formed below the pixel electrode.

A height of the upper surface of the color filter may be gradually lowered toward both edges of the pixel area from the center of the pixel area.

The display device may further include a light blocking member formed on a boundary of the pixel area and the thin film transistor. The color filters may be overlapped with each other on the boundary of the pixel area and the thin film transistor.

The organic layer may include a color filter formed in the pixel area; and a light blocking member formed on a boundary of the pixel area and the thin film transistor.

The display device may further include an insulating layer formed below the pixel electrode and made of an organic insulating material.

An embodiment of the present invention is related to a manufacturing method of a display device. The method may include forming a thin film transistor on a substrate including a plurality of pixel areas. The method may further include forming a pixel electrode in the pixel area so as to be connected with the thin film transistor. The method may further include forming a sacrificial layer on the pixel electrode so that the adjacent pixel areas in a first direction among the pixel areas are separated from each other and the sacrificial layer is connected along the adjacent pixel areas in a second direction; forming an organic layer on the common electrode with an organic material. The method may further include patterning the organic layer so that a height of the upper surface of the organic layer is gradually lowered toward both edges of the pixel area from the center of the pixel area and forming a liquid crystal injection hole by patterning the organic layer and the common electrode so that a part of the sacrificial layer is exposed at the upper and lower edges of the pixel area; forming a space between the pixel electrode and the common electrode by removing the sacrificial layer. The method may further include injecting a liquid crystal into the space through the liquid crystal injection hole; and sealing the space for each pixel area by forming an overcoat on the organic layer, in which in the forming of the liquid crystal injection hole, the common electrode is connected along the adjacent pixel areas in the first direction and is separated along the adjacent pixel areas in the second direction.

The method may further include forming a common electrode so as to cover the upper surface and a part of the side of the sacrificial layer, after forming the sacrificial layer.

The method may further include forming a common electrode so as to be spaced apart from the pixel electrode, before forming the sacrificial layer, in which the pixel electrode and the common electrode may have rod shapes, and the plurality of pixel electrodes and common electrodes may be alternately arranged in one pixel area.

In the patterning of the organic layer, the organic layer may be patterned so that the upper surface of the organic layer and the substrate becomes gradually closer toward both edges of the pixel area from the center of the pixel area.

The organic layer may be patterned so that an angle between the substrate and the upper surface of the organic layer is 1 degree or more and 10 degrees or less.

The organic layer may be patterned so that an angle between the substrate and the upper surface of the organic layer is 1.5 degrees or more and 2 degrees or less.

In the patterning of the organic layer, the organic layer may be patterned by using a mask including a plurality of mask region corresponding to the plurality of pixel areas, in which the mask region includes a plurality of transmissive portions and a plurality of opaque portions, the plurality of opaque portions may have the same width, and the plurality of transmissive portions may have widths which are gradually widened toward both edges of the mask region from the center of the mask region.

The display device and the manufacturing method thereof according to one or more embodiments of the present invention have the following effects.

According to one or more embodiments of the present invention, the display device is manufactured using only one substrate, such that it is possible to reduce weight, thickness, cost, and manufacturing time thereof.

The organic layer is formed to include slanted portions that are slanted with respect to the substrate, for forming a substantially robust structure. A force applied to the display device from the outside may be effectively dispersed, such that damage to the display device may be avoided.

The organic layer may be patterned using a mask including transmissive portions having widths which are gradually widened toward both edges from the center, such that the organic layer may be formed with a substantially robust structure that includes slanted portions.

DETAILED DESCRIPTION OF THE EMBODIMENTS

Figure 1:
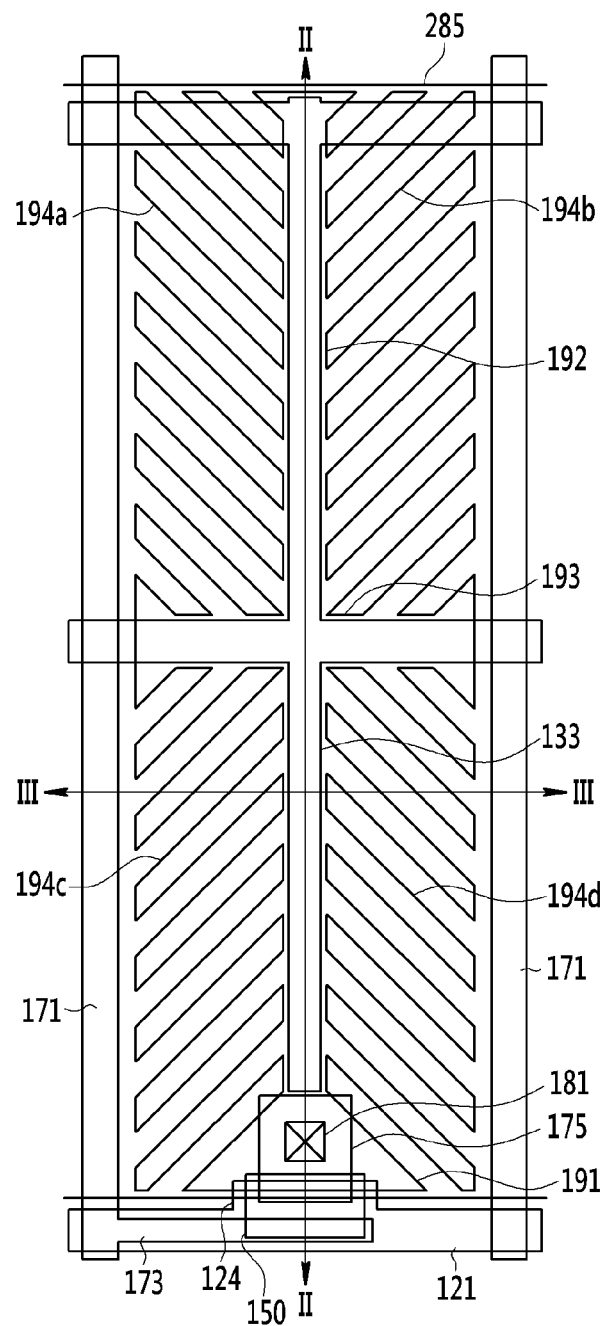
FIG. 1 is a plan view illustrating a pixel of a display device according to one or more embodiments of the present invention.

The present invention will be described more fully hereinafter with reference to the accompanying drawings, in which exemplary embodiments of the invention are illustrated. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals may designate like elements throughout the specification. It will be understood that when a first element such as a layer, film, region, or substrate is referred to as being "on" a second element, it can be directly on the other element, or intervening elements may also be present between the first element and the second element. In contrast, when a first element is referred to as being "directly on" a second element, there are no intervening elements present between the first element and the second element.

First, a display device according to one or more embodiment of the present invention will be described below with reference to the accompanying drawings.

Figure 2:
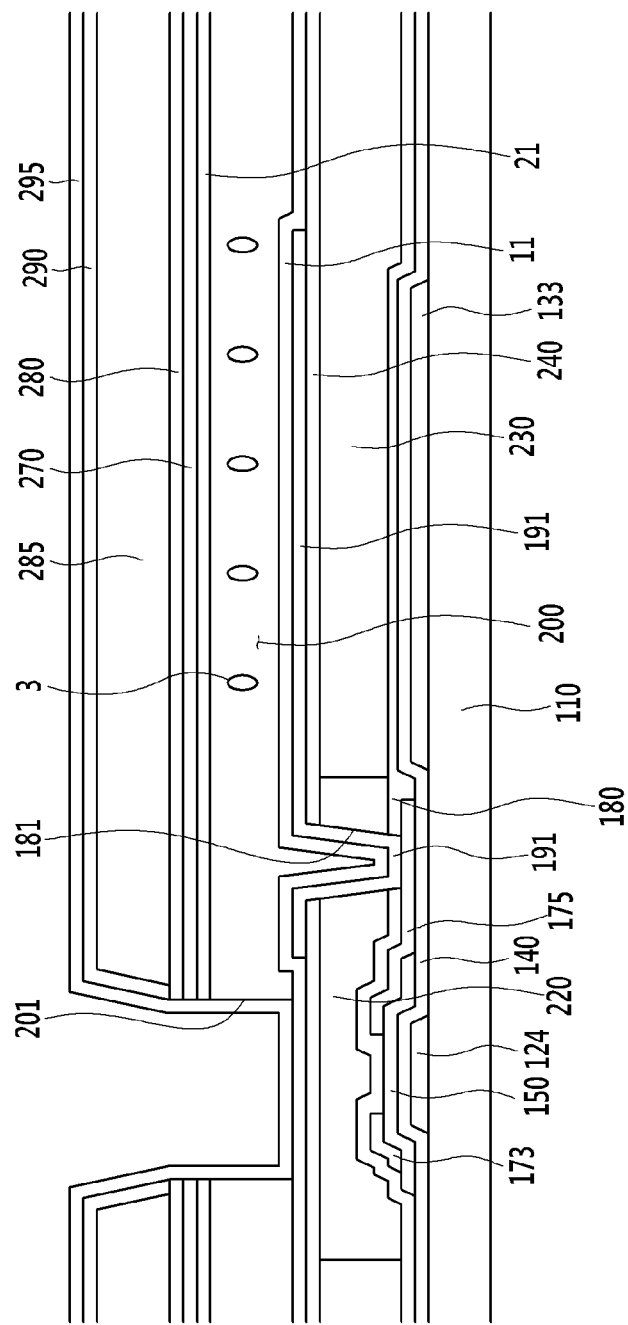
FIG. 2 is a cross-sectional view taken along line II-II of FIG. 1 for illustrating the pixel of the display device according to one or more embodiments of the present invention.
Figure 3:
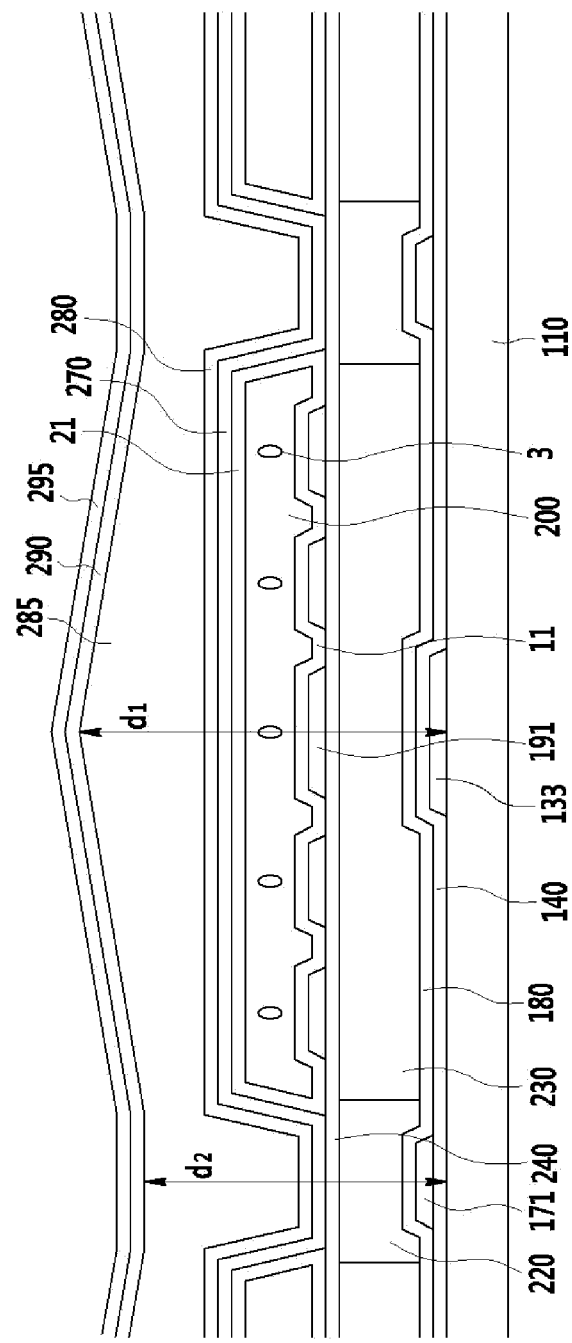
FIG. 3 is a cross-sectional view taken along line III-III of FIG. 1 for illustrating the pixel of the display device according to one or more embodiments of the present invention.

FIG. 1 is a plan view illustrating a pixel of a display device according to one or more embodiments of the present invention. FIG. 2 is a cross-sectional view taken along line II-II of FIG. 1 for illustrating the pixel of the display device according to one or more embodiments of the present invention. FIG. 3 is a cross-sectional view taken along line III-III of FIG. 1 for illustrating the pixel of the display device according to one or more embodiment of the present invention.

The display device includes gate lines 121 extending in a first direction and data lines 171 extending in a second direction. The gate lines 121 and the date lines 171 may cross each other and may be disposed on a substrate 110, which may be formed of glass or plastic.

The substrate 110 includes a plurality of pixel areas. The plurality of pixel areas may be defined by the gate lines 121 and the date lines 171.

The gate lines 121 mainly extend in a horizontal direction and are configured to transfer gate signals. A gate electrode 124 may protrude from a gate line 121. A gate signal is applied to the gate electrode 124 through the gate line 121.

A storage electrode 133 may be formed in the pixel area without being electrically connected with the gate line 121 and the gate electrode 124. As illustrated in FIG. 1, the storage electrode 133 may be including two portions substantially parallel to the gate line 121 and substantially parallel to the data line 171, respectively. In one or more embodiments, the storage electrode 133 may include a portion parallel with the gate line 121 without including a portion parallel with the data line 171. A plurality of storage electrodes 133 formed in adjacent pixel areas may be electrically connected to each other. A predetermined voltage such as common voltage is applied to the storage electrode 133.

A gate insulating layer 140 is formed (directly) on the gate line 121, the gate electrode 124, and the storage electrode 133. The gate insulating layer 140 may be made of an inorganic insulating material such as one or more of silicon nitride (SiNx) and silicon oxide (SiOx). The gate insulating layer 140 may have a single layer structure or a multilayer structure.

A semiconductor layer 150 is formed (directly) on the gate insulating layer 140. The semiconductor layer 150 may overlap the gate electrode 124. The semiconductor layer 150 may extend below at least a portion of the data line 171. The semiconductor layer 150 may be made of one or more of amorphous silicon, polycrystalline silicon, metal oxide, etc.

On the semiconductor layer 150, a source electrode 173 protruding from the data line 171 and a drain electrode 175 spaced apart from the source electrode 173 are formed.

The data lines 171 mainly extend in a vertical direction and are configured to transfer data signals. The data signal transferred to a data line 171 is applied to the source electrode 173.

The gate electrode 124, the semiconductor layer 150, the source electrode 173, and the drain electrode 175 may form a thin film transistor. When the thin film transistor is turned on, the data signal applied to the source electrode 173 is transferred to the drain electrode 175.

A passivation layer 180 is formed on and directly contacts a portion the semiconductor layer 150 that is exposed by the data line 171, the source electrode 173, and the drain electrode 175. The passivation layer 180 may be made of an organic insulating material or an inorganic insulating material and may have a single layer structure or a multilayer structure.

A color filter 230 in each pixel area is formed (directly) on the passivation layer 180. Each color filter 230 may display one of primary colors, such as one of the three primary colors of red, green, and blue. In one or more embodiments, the color filter 230 may display one or more of cyan, magenta, yellow, and white-based colors.

A light blocking member 220 is formed in a region between adjacent color filters 230. The light blocking member 220 is formed on a boundary of the pixel area and the thin film transistor to prevent light leakage.

A first insulating layer 240 may be formed on the color filter 230 and the light blocking member 220. The first insulating layer 240 may be made of an inorganic insulating material, such as one or more of silicon nitride (SiNx) and silicon oxide (SiOx). The first insulating layer 240 serves to protect the color filter 230 (made of an organic material) and the light blocking member 220. In one or more embodiments, the first insulating layer 240 may be omitted.

A contact hole 181 is formed in and/or formed through the first insulating layer 240, the light blocking member 220, and the passivation layer 180 so that a part of the drain electrode 175 is exposed. In one or more embodiments, the contact hole 181 may be formed in the color filter 230 instead of the light blocking member 220.

A pixel electrode 191 is electrically connected with the drain electrode 175 through the contact hole 181 and is formed on the first insulating layer 240. The pixel electrode 191 is formed in each pixel area and is electrically connected with the drain electrode 175 to receive the data signal from the drain electrode 175 when the thin film transistor is turned on. The pixel electrode 191 may be made of a transparent metal material, such as one or more of indium tin oxide (ITO) and indium zinc oxide (IZO).

The pixel electrode 191 includes a horizontal stem 193, a vertical stem 192 substantially orthogonal (or substantially perpendicular) to the horizontal stem 193, and a plurality of first to fourth minute branches 194a, 194b, 194c, and 194d.

The horizontal stem 193 may be substantially parallel to the gate line 121. The vertical stem 192 may be substantially parallel to the data line 171. The horizontal stem 193 may be substantially in the middle between two adjacent gate lines 121. The vertical stem 192 may be substantially in the middle between two adjacent data lines 171.

One pixel area is divided into a first subpixel area, a second subpixel area, a third subpixel area, and a fourth subpixel area by the horizontal stem 193 and the vertical stem 192. The first subpixel area is positioned at the left portion of the horizontal stem 193 and the upper portion of the vertical stem 192. The second subpixel area is positioned at the right portion of the horizontal stem 193 and the upper portion of the vertical stem 192. The third subpixel area is positioned at the left portion of the horizontal stem 193 and the lower portion of the vertical stem 192. The fourth subpixel area is positioned at the right portion of the horizontal stem 193 and the lower portion of the vertical stem 192.

The first minute branch 194a is formed in the first subpixel area. The second minute branch 194b is formed in the second subpixel area. The third minute branch 194c is formed in the third subpixel area. The fourth minute branch 194d is formed in the fourth subpixel area.

The first minute branch 194a extends obliquely in an upper left direction from the horizontal stem 193 and/or from the vertical stem 192. The second minute branch 194b extends obliquely in an upper right direction from the horizontal stem 193 and/or from the vertical stem 192. The third minute branch 194c extends obliquely in a lower left direction from the horizontal stem 193 and/or from the vertical stem 192. The fourth minute branch 194d extends obliquely in a lower right direction from the horizontal stem 193 and/or from the vertical stem 192.

Each of the first to the fourth minute branches 194a to 194d may be formed so as to form an angle of substantially 45 degrees or 135 degrees with respect to the gate line 121 or the horizontal stem 193. Two of the first to the fourth minute branches 194a to 194d of adjacent subpixel areas may be formed to be perpendicular to each other.

The shape of the pixel electrode 191 illustrated in FIG. 1 may be variously modified in one or more embodiments. In one or more embodiments, a pixel area may be divided into more than four areas. In one or more embodiments, a pixel area may not be divided into a plurality of subpixel areas.

A common electrode 270 is formed to overlap the pixel electrode 191 and is spaced apart from the pixel electrode 191 with a predetermined distance. A space 200 is formed between the pixel electrode 191 and the common electrode 270. The width and the area of the space 200 may be determined according to the resolution of the display device.

A liquid crystal material 3 is filled in the space 200. The liquid crystal material 3 includes a plurality of liquid crystal molecules, and may be oriented in a direction substantially vertical to the substrate 110 when no electric field is applied to the liquid crystal material 3. That is, a vertical alignment may be formed. In one or more embodiments, a horizontal alignment may be formed when no electric field is applied to the liquid crystal material 3.

The liquid crystal material 3 may be made of or may include one or more of nematic, smetic, cholesteric, chiral, and BMD liquid crystal materials. The liquid crystal material 3 may be made of a negative liquid crystal material or a positive liquid crystal material.

In one or more embodiments, pixel electrode 191 is formed below the space 200, and the common electrode 270 is formed above the space 200 as described above. In one or more embodiments, both the pixel electrode 191 and the common electrode 270 may be formed below the space 200. In one or more embodiments, the pixel electrode 191 and the common electrode 270 may be formed on the same layer. In one or more embodiments, the pixel electrode 191 and the common electrode 270 may be formed on different layers with an insulating layer disposed between the pixel electrode 191 and the common electrode 270. In one or more embodiments, the liquid crystal material 3 may be formed in the space 200 so as to lie in a direction parallel to the substrate 110.

A first alignment layer 11 is formed on the pixel electrode 191. The first alignment layer 11 may be formed on and may directly contact a portion of the first insulating layer 240 that is not covered by the pixel electrode 191.

A second alignment layer 21 is formed below the common electrode 270 so as to face the first alignment layer 11.

The first alignment layer 11 and the second alignment layer 21 may be vertical alignment layers and may be made of one or more of polyamic acid, polysiloxane, and polyimide. The first and second alignment layers 11 and 12 may be connected with each other at an edge of the pixel area.

As illustrated in FIG. 3, the space 200 is surrounded by the first insulating layer 240, the pixel electrode 191, and the common electrode 270. The common electrode 270 is formed to directly contact a portion of the first insulating layer 240 that overlaps the data line 171, thereby confining the left side and the right side of the space 200 at positions corresponding to the data lines 171. The common electrode 270 is continuous along adjacent pixel areas in a row direction.

As can be appreciated from FIG. 2, the common electrode 270 may not overlap the gate line 121 and may not cover the upper side and the lower side of pixel beyond the space 200 at a portion adjacent to the gate line 121. A liquid crystal injection hole 201 may be formed on at least one of the upper side and the lower side of the space 200 for injecting the liquid crystal material 3. In one or more embodiments, a plurality of liquid crystal injection holes 201 may be formed along the gate line 121, and the liquid crystal material 3 may be injected into the space 200 through the liquid crystal injection holes 201.

In one or more embodiments, the common electrode 270 covers and/or confines the left side and the right side of the space 200, but does not cover the upper side and the lower side of the space 200. In one or more embodiments, the common electrode 270 may cover at least one of the upper side and the lower side of the space 200. In one or more embodiments, the common electrode 270 may cover the upper side and the lower side of the space 200, but may not cover the left side and/or the right side thereof. In one or more embodiments, a plurality of liquid crystal injection holes 201 may be formed along the data line 171.

A second insulating layer 280 may be formed on the common electrode 270. The second insulating layer 280 may be made of an inorganic insulating material, such as one or more of silicon nitride (SiNx) and silicon oxide (SiOx). In one or more embodiments, the second insulating layer 280 may be omitted.

An organic layer 285 is formed on the second insulating layer 280. The organic layer 285 may be made of an organic material. The organic layer may functions as a protective layer. The lower surface of the organic layer 285 is disposed between the substrate 110 and the upper surface of the organic layer 285. The upper surface of the organic layer 285 is formed to include one or more potions that are slanted (or oblique) with respect to the substrate 110. In one or more embodiments, the upper surface of the organic layer 285 may include a plurality of potions slanted with respect to the substrate 110. A height of the upper surface of the organic layer 285 may be formed to be gradually lowered toward left and right edges of the pixel area from the center of the pixel area. Accordingly, the upper surface of the organic layer 285 and the substrate 110 may gradually become closer toward the left and right edges of the pixel area from the center of the pixel area.

The upper surface of the organic layer 285 may include a first portion (e.g., a ridge portion) and a second portion (e.g., a valley portion). The first portion may overlap at least one of the vertical stem electrode 192, the horizontal stem electrode 193, the storage electrode 133, a center portion of the liquid crystal material 3, and a center portion of the space 200. The second portion may overlap at least one of a data line 171, an edge portion of the liquid crystal material 3, and an edge portion of the space 200. The distance between the first portion and the substrate 110 may be greater than the distance between the second portion and the substrate 110. The distance between the upper surface of the organic layer 285 and the substrate 110 may gradually decrease from the first portion to the second portion.

The organic layer 285 may include a first portion (e.g., a ridge portion) that has a first thickness and overlaps at least one of the vertical stem electrode 192, the horizontal stem electrode 193, the storage electrode 133, a center portion of the liquid crystal material 3, and a center portion of the space 200. The organic layer 285 may include a second portion (e.g., a valley portion) that has a second thickness and overlaps an edge portion of the liquid crystal material 3 and/or an edge portion of the space 200 in the pixel. The first thickness may be greater than the second thickness.

Assuming a case where organic layer 285 were flat and parallel to the substrate 110, when a pressing force is applied to the organic layer 285, the space 200 (positioned below the organic layer 285) would not provide sufficient support to the organic layer 285, and as a result, the organic layer 285 might not stand the external pressure and might be broken.

In one or more embodiments, since the upper surface of the organic layer 285 include one or more portions that are slanted with respect to the substrate 110, when a pressing force is applied to the organic layer 285, at least a portion of the pressing force may be dispersed to the (left and right) edges of the organic layer 285. The left and right edges of the organic layer 285 may not have a space disposed below and may be supported by the light blocking member 220 to effectively stand against the external pressure.

An angle between the substrate 110 and the upper surface of the organic layer 285 may be no less than 1 degree and no more than 10 degrees. In the case where the angle between the substrate 110 and the upper surface of the organic layer 285 is less than 1 degree, an effect to disperse the external pressure to the edges of the organic layer 285 may be insufficient. In the case where the angle between the substrate 110 and the upper surface of the organic layer 285 is more than 10 degrees, there may be problems, such as bubble generation, in a manufacturing process of the display device. For example, a bubble may be generated in a sealing process of the liquid crystal injection hole 201 or in an adhering process of a polarizing plate. More preferably, the angle between the substrate 110 and the upper surface of the organic layer 285 may be no less than 1.5 degrees and no more than 2 degrees.

In one or more embodiments, the height of the upper surface of the organic layer 285 (with respect to the substrate 110) may be (gradually) lowered toward the left and right edges of the pixel area from the center of the pixel area. Alternatively or additionally, the height of the upper surface of the organic layer 285 (relative to the substrate 110) may be (gradually) lowered toward the upper and lower edges of the pixel area from the center of the pixel area. In one or more embodiments, the upper surface of the organic layer 285 and the substrate 110 may gradually become closer toward the upper and lower edges of the pixel area from the center of the pixel area.

A third insulating layer 290 may be further formed on the organic layer 285. Since the third insulating layer 290 is formed on the organic layer 285 that has slanted portions, the third insulating layer 290 may be formed to include one or more portions that are slanted with respected to the substrate 110, like the organic layer 285.

The third insulating layer 290 may be made of an inorganic insulating material, such as at least one of silicon nitride (SiNx) and silicon oxide (SiOx). The third insulating layer 290 may be formed to cover the entire upper surface and the sides of the organic layer 285. The third insulating layer 290 serves to protect the organic layer 285, which is made of the organic material. In one or more embodiment, the third insulating layer 290 may also be omitted.

An overcoat 295 may be formed on the third insulating layer 290. As illustrated in FIG. 2, the overcoat 295 may cover the liquid crystal injection hole 201, where the space 200 is exposed. That is, the liquid crystal injection hole 201 may be sealed so that the liquid crystal material 3 is confined in the space 200. Since the overcoat 295 may contact the liquid crystal material 3, the overcoat 295 may be made of a material that does not chemically react with the liquid crystal material 3. For example, the overcoat 295 may be made of perylene.

Since the overcoat 295 is formed on the slanted third insulating layer 290, the overcoat 295 may also be formed to include one or more portions that are slanted with respect to the substrate 110, like the third insulating layer 290. In one or more embodiments, the overcoat 295 may include a substantially flat upper surface configured to planarize the substrate 110. In one or more embodiments, the overcoat 295 may include an organic layer.

Next, a display device according to one or more embodiments of the present invention will be described below with reference to FIG. 4.

The display device discussed with reference to FIG. 4 may include elements that are analogous to elements of the display device discussed with reference to FIGS. 1-3. In one or more embodiments, as illustrated in FIG. 4, the upper surface of the color filter 230 may include one or more portions that are slanted with respect to the substrate 110.

Figure 4:
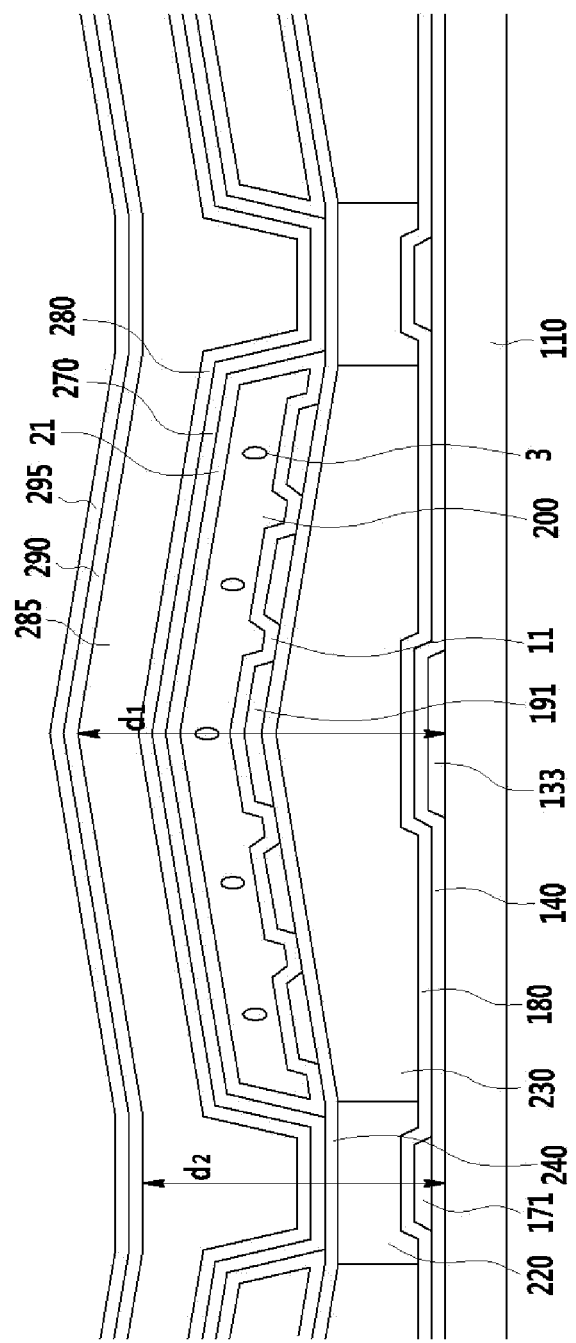
FIG. 4 is a cross-sectional view illustrating a display device according to one or more embodiments of the present invention.

FIG. 4 is a cross-sectional view illustrating a display device according to one or more embodiments of the present invention.

In the display device illustrated in FIG. 4, constituent elements may be laminated in the same order as elements of the display device discussed with reference to FIGS. 1-3.

In one or more embodiments, as illustrated in FIG. 3, the color filter 230 may have an upper surface that is parallel to the substrate 110. In one or more embodiments, the upper surface of the color filter 230 may include one or more portions that are slanted with respect to the substrate 110. As illustrated in FIG. 4, the upper surface of the color filter 230 may include a plurality of portions slanted with respect to the substrate 110.

A height of the upper surface of the color filter 230 may be gradually lowered toward left and right edges of the pixel area from the center of the pixel area. Accordingly, the upper surface of the color filter 230 and the substrate 110 may gradually become closer toward the left and right edges of the pixel area from the center of the pixel area.

The upper surface of the color filter 230 may include a first portion (e.g., a ridge portion) and a second portion (e.g., an edge portion). The second portion may be disposed between the first portion and the light blocking member 220. The first portion may overlap at least one of the vertical stem electrode 192, the horizontal stem electrode 193, the storage electrode 133, a center portion of the liquid crystal material 3, and a center portion of the space 200. The second portion may overlap at least one of an edge portion of the liquid crystal material 3 and an edge portion of the space 200. The distance between the first portion and the substrate 110 may be greater than the distance between the second portion and the substrate 110. The distance between the upper surface of the color filter 230 and the substrate 110 may gradually decrease from the first portion to the second portion.

The color filter 230 may include a first portion (e.g., a ridge portion) that has a first thickness and corresponds to at least one of the vertical stem electrode 192, the horizontal stem electrode 193, the storage electrode 133, a center portion of the liquid crystal material 3, and a center portion of the space 200. The organic layer 285 may include a second portion (e.g., an edge portion) that has a second thickness and corresponds to an edge portion of the liquid crystal material 3 and/or an edge portion of the space 200 in the pixel. The second portion may be disposed between the first portion and the light blocking member 220. The first thickness may be greater than the second thickness. An angle between the substrate 110 and the upper surface of the color filter 230 may be at least 1 degree and at most 10 degrees. In one or more embodiments, an angle between the substrate 110 and the upper surface of the color filter 230 may be at least 1.5 degrees and at most 2 degrees.

In one or more embodiments, the height of the upper surface of the color filter 230 (with respect to the substrate 110) may be (gradually) lowered toward the left and right edges of the pixel area from the center of the pixel area. Alternatively or additionally, the height of the upper surface of the color filter 230 (relative to the substrate 110) may be (gradually) lowered toward the upper and lower edges of the pixel area from the center of the pixel area. In one or more embodiments, the upper surface of the color filter 230 and the substrate 110 may gradually become closer toward the upper and lower edges of the pixel area from the center of the pixel area.

Since the upper surface of the color filter 230 is formed to include one or more portions that are slanted with respect to the substrate 110, the upper surface of the organic layer 285, which is formed on the color filter 230, may also be formed to include one or more portions that are slanted with respect to the substrate 110.

Advantageously, as discussed above, the organic layer 285 may have a substantially robust structure and may effectively stand against external pressure.

In one or more embodiments, one or more of the first insulating layer 240, the pixel electrode 191, the first alignment layer 11, the second alignment layer 21, the common electrode 270, the second insulating layer 280, the third insulating layer 290, the overcoat 295, etc., which are laminated on the color filter 230, may also be formed to include one or more portions that are slanted with respect to the substrate 110.

Next, a display device according to one or more embodiments of the present invention will be described below with reference to FIG. 5.

The display device discussed with reference to FIG. 5 may include elements that are analogous to elements of the display device(s) discussed with reference to one or more of FIGS. 1-4. In one or more embodiments, as illustrated in FIG. 5, the display device may not include additional light blocking members between the color filters 230.

Figure 5:
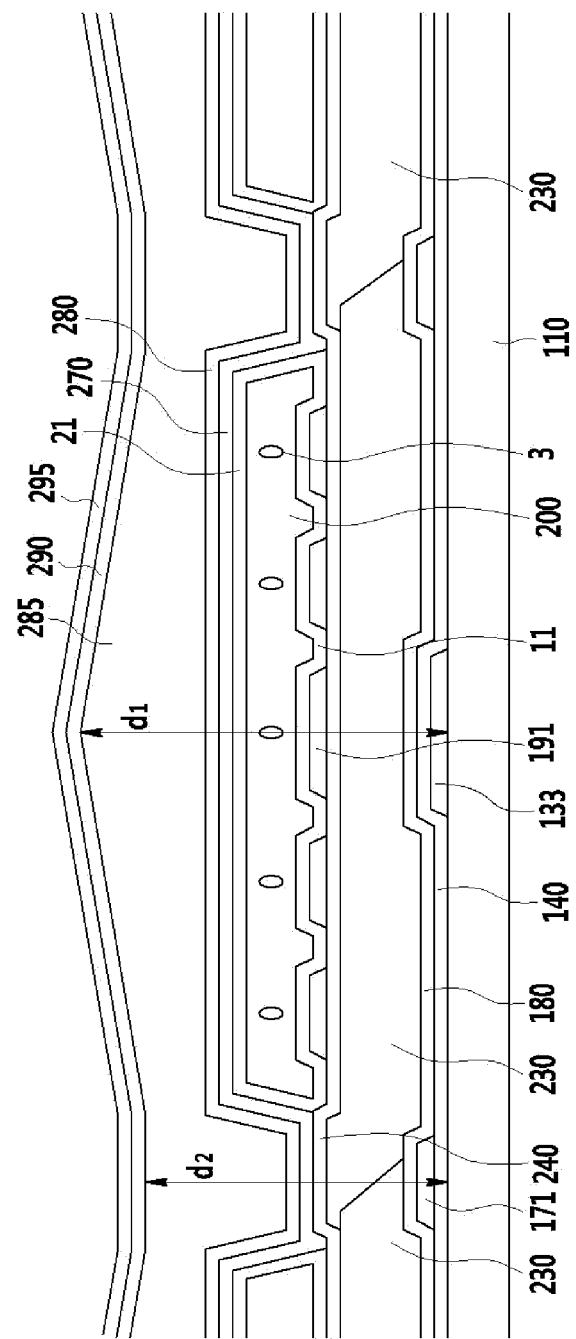
FIG. 5 is a cross-sectional view illustrating a display device according to one or more embodiments of the present invention.

FIG. 5 is a cross-sectional view illustrating a display device according to one or more embodiments of the present invention.

In the display device, a thin film transistor is formed on the substrate 110, and the passivation layer 180 is formed on the thin film transistor.

In one or more embodiments, as illustrated in FIG. 3, the color filter 230 is formed only in a pixel area on the passivation layer 180. In one or more embodiments, as illustrated in FIG. 5, the color filter 230 is formed in the pixel area on the passivation layer 180 and at a boundary of the pixel area. In one or more embodiments, no light blocking member is disposed between the color filters 230.

The color filters 230 are formed to overlap each other on the boundary of the pixel area (and on the thin film transistor). The color filters 230 may include color filters that have the same color along a column direction of the plurality of pixel areas and may include color filters that have different colors along a row direction of the pixel areas. The color filters 230 may include a first-colored color filter, a second-colored color filter, and a third-colored color filter. The first-colored color filter 230 and the second colored color filter 230 may be adjacent to each other in the row direction and may overlap each other on the boundary of the pixel areas (and on the thin film transistor). The second-colored color filter 230 may overlap the third-colored color filter 230. The light blocking member may be replaced by overlapping the different-colored color filters 230. For example, an overlap portion that includes a portion of the first-colored color filter and a portion of the second-colored color filter have a substantially dark combined color and may effectively block potential light leakage. The portion of the first-colored color filter may be disposed between the portion of the second-colored color filter and a data line 171.

Next, a display device according to one or more embodiments of the present invention will be described below with reference to FIG. 6.

The display device discussed with reference to FIG. 6 may include elements that are analogous to the display device(s) discussed with reference to one or more of FIGS. 1-5. In one or more embodiments, as illustrated in FIG. 6, the color filter 230 and the light blocking member 220 are formed on the common electrode 270 to serve as the organic layer 285 illustrated in FIG. 3.

Figure 6:
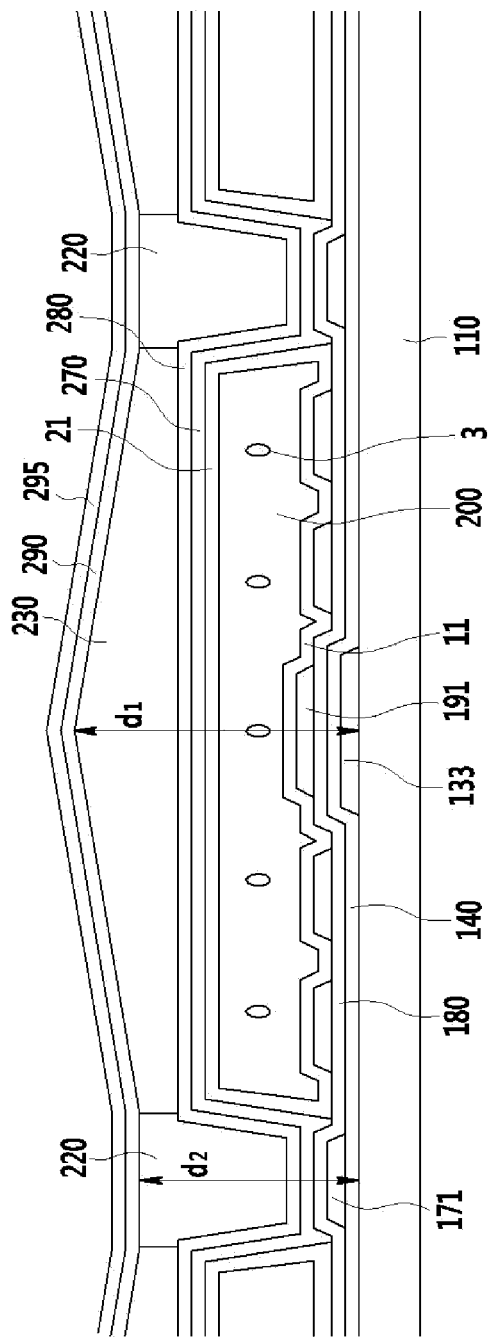
FIG. 6 is a cross-sectional view illustrating a display device according to one or more embodiments of the present invention.

FIG. 6 is a cross-sectional view illustrating a display device according to one or more embodiments of the present invention.

In the display device, a thin film transistor is formed on the substrate 110, and the passivation layer 180 is formed on the thin film transistor.

In one or more embodiments, as illustrated in FIG. 3, the color filter 230 is formed on the passivation layer 180, the first insulating layer 240 is formed on the color filter 230, and the pixel electrode 191 is formed on the first insulating layer 240. In one or more embodiments, as illustrated in FIG. 6, the pixel electrode 191 is formed directly on the passivation layer 180.

The common electrode 270, which is spaced apart from the pixel electrode 191 by the space 200, overlaps the pixel electrode 191. The second insulating layer 280 is formed on the common electrode 270.

The color filter 230 in each pixel area is formed on the second insulating layer 280, and the light blocking member 220 is formed in a region between adjacent color filters 230. At least a portion of the common electrode 270 may be disposed between the liquid crystal material 3 and the color filter 230.

The upper surface of the color filter 230 is formed to have one or more portions that are slanted with respect to the substrate 110. A height of the upper surface of the color filter 230 may be gradually lowered toward left and right edges of the pixel area from the center of the pixel area. Accordingly, the upper surface of color filter 230 and the substrate 110 may gradually become closer toward the left and right edges of the pixel area from the center of the pixel area.

The upper surface of the color filter 230 may include a first portion (e.g., a ridge portion) and a second portion (e.g., an edge portion). The second portion may be disposed between the first portion and the light blocking member 220. The first portion may overlap at least one of the vertical stem electrode 192, the horizontal stem electrode 193, the storage electrode 133, a center portion of the liquid crystal material 3, and a center portion of the space 200. The second portion may overlap at least one of an edge portion of the liquid crystal material 3 and an edge portion of the space 200. The distance between the first portion and the substrate 110 may be greater than the distance between the second portion and the substrate 110. The distance between the upper surface of the color filter 230 and the substrate 110 may gradually decrease from the first portion to the second portion.

The color filter 230 may include a first portion (e.g., a ridge portion) that has a first thickness and corresponds to at least one of the vertical stem electrode 192, the horizontal stem electrode 193, the storage electrode 133, a center portion of the liquid crystal material 3, and a center portion of the space 200. The organic layer 285 may include a second portion (e.g., an edge portion) that has a second thickness and corresponds to an edge portion of the liquid crystal material 3 and/or an edge portion of the space 200 in the pixel. The second portion may be disposed between the first portion and the light blocking member 220. The first thickness may be greater than the second thickness.

An angle between the substrate 110 and the upper surface of the color filter 230 may be at least 1 degree and at most 10 degrees. In one or more embodiments, an angle between the substrate 110 and the upper surface of the color filter 230 may be at least 1.5 degrees and at most 2 degrees.

In one or more embodiments, the height of the upper surface of the color filter 230 (with respect to the substrate 110) may be (gradually) lowered toward the left and right edges of the pixel area from the center of the pixel area. Alternatively or additionally, the height of the upper surface of the color filter 230 (relative to the substrate 110) may be (gradually) lowered toward the upper and lower edges of the pixel area from the center of the pixel area. In one or more embodiments, the upper surface of the color filter 230 and the substrate 110 may gradually become closer toward the upper and lower edges of the pixel area from the center of the pixel area.

As illustrated in FIG. 6, an additional organic layer is not required, and the color filter 230 and the light blocking member 220 are formed on the common electrode to serve the function of the organic layer 285 illustrated in FIG. 3. Advantageously, the manufacturing cost of the display device and the thickness of the display device may be minimized.

Next, a display device according to one or more embodiments of the present invention will be described below with reference to FIG. 7.

The display device discussed with reference to FIG. 7 may include elements that are analogous to elements of the display device(s) discussed with reference to one or more of FIGS. 1-6. In one or more embodiments, as illustrated in FIG. 7, insulating layers 225 and 240 are formed between the passivation layer 180 and the pixel electrode 191, for enhancing electrical insulation between the pixel electrode 191 and at least the storage electrode 133.

Figure 7:
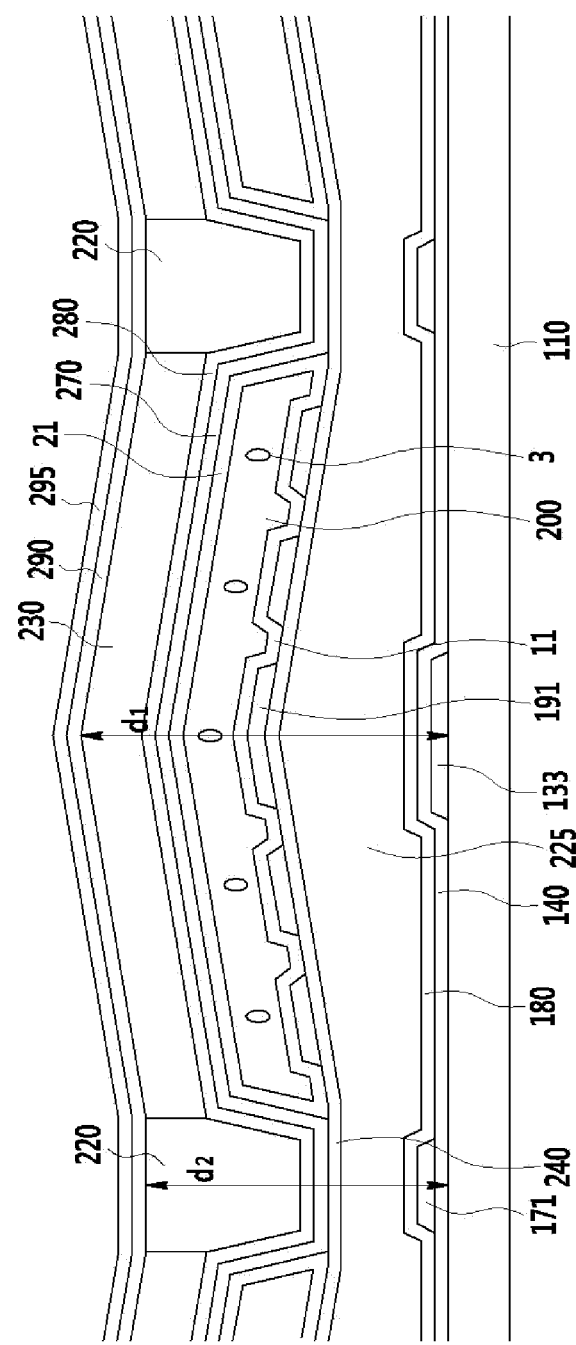
FIG. 7 is a cross-sectional view illustrating a display device according to one or more embodiments of the present invention.

FIG. 7 is a cross-sectional view illustrating a display device according to one or more embodiments of the present invention.

In the display device, a thin film transistor is formed on the substrate 110, and the passivation layer 180 is formed on the thin film transistor.

In one or more embodiments, as illustrated in FIG. 6, the pixel electrode 191 is formed directly on the passivation layer 180. In one or more embodiments, as illustrated in FIG. 7, a fourth insulating layer 225 is formed on the passivation layer 180, the first insulating layer 240 is formed on the fourth insulating layer 225, and the pixel electrode 191 is formed on the first insulating layer 240.

The fourth insulating layer 225 may be made of an organic insulating material, and the first insulating layer 240 may be made of an inorganic insulating material.

The upper surface of the fourth insulating layer 225 is formed to include one or more potions that are slanted (or oblique) with respect to the substrate 110. In one or more embodiments, the upper surface of the organic layer 285 may include a plurality of potions slanted with respect to the substrate 110. A height of the upper surface of the fourth insulating layer 225 may be gradually lowered toward left and right edges of the pixel area from the center of the pixel area. Accordingly, the upper surface of the fourth insulating layer 225 and the substrate 110 may gradually become closer toward the left and right edges of the pixel area from the center of the pixel area.

The upper surface of the fourth insulating layer 225 may include a first portion (e.g., a ridge portion) and a second portion (e.g., a valley portion). The first portion may overlap at least one of the vertical stem electrode 192, the horizontal stem electrode 193, the storage electrode 133, a center portion of the liquid crystal material 3, and a center portion of the space 200. The second portion may overlap at least one of a data line 171, an edge portion of the liquid crystal material 3, and an edge portion of the space 200. The distance between the first portion and the substrate 110 may be greater than the distance between the second portion and the substrate 110. The distance between the upper surface of the fourth insulating layer 225 and the substrate 110 may gradually decrease from the first portion to the second portion.

The fourth insulating layer 225 may include a first portion (e.g., a ridge portion) that has a first thickness and overlaps at least one of the vertical stem electrode 192, the horizontal stem electrode 193, the storage electrode 133, a center portion of the liquid crystal material 3, and a center portion of the space 200. The fourth insulating layer 225 may include a second portion (e.g., a valley portion) that has a second thickness and overlaps at least one of a data line 171, an edge portion of the liquid crystal material 3, and an edge portion of the space 200 in the pixel. The first thickness may be greater than the second thickness.

An angle between the substrate 110 and the upper surface of the fourth insulating layer 225 may be at least 1 degree and at most 10 degrees. In one or more embodiments, an angle between the substrate 110 and the upper surface of the fourth insulating layer 225 may be at least 1.5 degrees and at most 2 degrees.

In one or more embodiments, the height of the upper surface of the fourth insulating layer 225 (with respect to the substrate 110) may be (gradually) lowered toward the left and right edges of the pixel area from the center of the pixel area. Alternatively or additionally, the height of the upper surface of the fourth insulating layer 225 (relative to the substrate 110) may be (gradually) lowered toward the upper and lower edges of the pixel area from the center of the pixel area. In one or more embodiments, the upper surface of the fourth insulating layer 225 and the substrate 110 may gradually become closer toward the upper and lower edges of the pixel area from the center of the pixel area.

Since the upper surface of the fourth insulating layer 225 is formed include one or more portions that are slanted with respect to the substrate 110, the upper surface of the color filter 230, which is formed on the fourth insulating layer 225, may also be formed to include one or more portions that are slanted to the substrate 110. Advantageously, the color filter 230 may have a substantially robust structure and may effectively stand against external pressure.

In one or more embodiments, one or more of the first insulating layer 240, the pixel electrode 191, the first alignment layer 11, the second alignment layer 21, the common electrode 270, the second insulating layer 280, the third insulating layer 290, the overcoat 295, etc., which are laminated on the fourth insulating layer 225, may also be formed to include one or more portions that are slanted with respect to the substrate 110.

Next, a manufacturing method of a display device, for example, a display device discussed with reference to FIGS. 1-3, according to one or more embodiments of the present invention will be described below with reference to FIGS. 8 to 22. Methods analogous to the method discussed with reference to FIGS. 8-22 but with slight changes may be used for manufacturing display devices in accordance with one or more embodiments of the invention.

FIGS. 8 to 19 and FIGS. 21 to 24 are process cross-sectional views illustrating a manufacturing method of a display device according to one or more embodiments of the present invention. FIGS. 8, 10, 12, 14, 16, 18, 21 and 23 illustrate cross-sectional views taken along a same line. FIGS. 9, 11, 13, 15, 17, 19, 22, and 24 illustrate cross-sectional views taken along a same line. FIG. 20 is a plan view illustrating a mask used to perform processes illustrated in FIGS. 18 and 19 according to one or more embodiments of the present invention.

Figure 8:
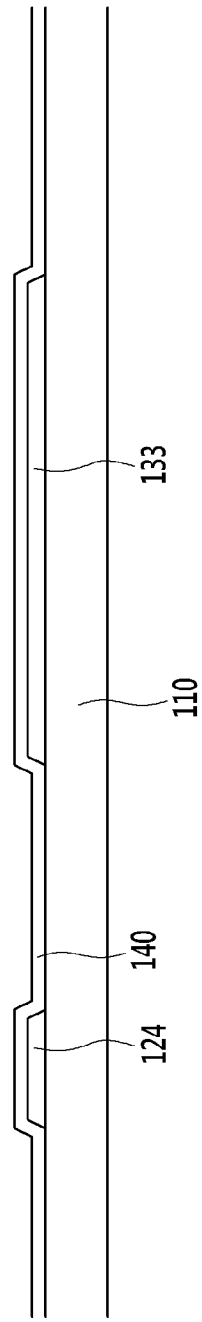
FIGS. 8 to 19 and FIGS. 21 to 24 are process cross-sectional views illustrating one or more manufacturing methods of a display device according to one or more embodiments of the present invention.
Figure 9:
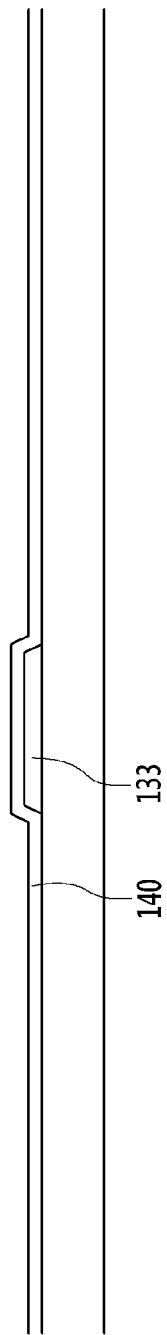

Referring to FIGS. 8 and 9, at least a gate line (not shown) extending in a first direction and a gate electrode 124 protruding from the gate line are formed on a substrate 110 made of glass and/or plastic. A storage electrode 133 is formed to be spaced apart from the gate line and the gate electrode 124. The storage electrode 133 may be formed of the same material as the gate line and the gate electrode 124.

Subsequently, a gate insulating layer 140 is formed using an inorganic insulating material, such as silicon oxide or silicon nitride, on the entire surface of the substrate 110 to cover the gate line, the gate electrode 124, and the storage electrode 133. The gate insulating layer 140 may have a single layer structure or a multilayer structure.

Figure 10:
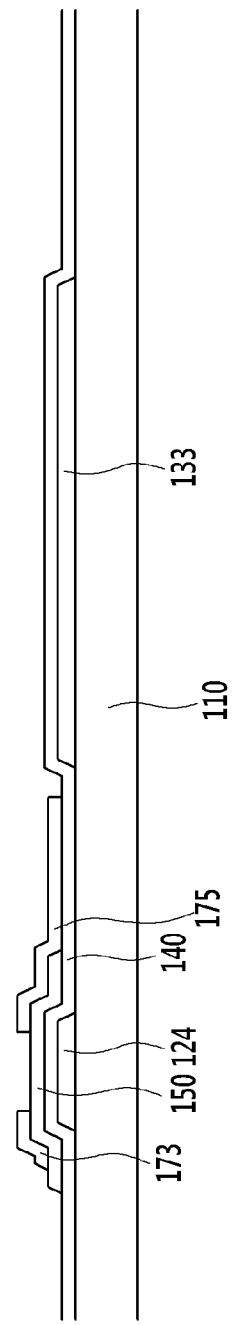
Figure 11:
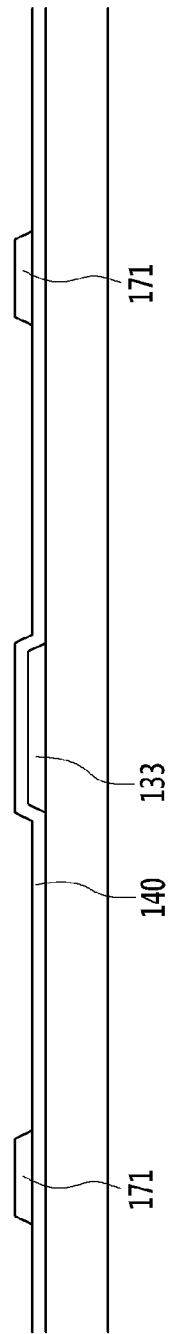

Referring to FIGS. 10 and 11, a semiconductor layer 150 is formed by depositing a semiconductor material (such as amorphous silicon, polycrystalline silicon, and metal oxide) on the gate insulating layer 140 and then patterning the deposited semiconductor material. The semiconductor layer 150 may be formed to be positioned on (and/or overlap) the gate electrode 124.

Next, a metal material is deposited and patterned to form a data line 171 extending in a second direction. A source electrode 173, which protrudes from the data line 171 onto the semiconductor layer 150, and a drain electrode 175, which is spaced apart from the source electrode 173, are formed. The metal material may have a single layer structure or a multilayer structure.

The semiconductor material and the metal material may be continuously deposited and then simultaneously patterned to form the semiconductor layer 150, the data line 171, the source electrode 173, and the drain electrode 175. In one or more embodiments, the semiconductor layer 150 may extend below the data line 171.

The gate electrode 124, the semiconductor layer 150, the source electrode 173, and the drain electrode 175 may form a thin film transistor. The gate line and the data line 171 may cross each other, and a plurality of pixel areas may be defined by a plurality of gate lines and a plurality of data lines 171.

Figure 12:
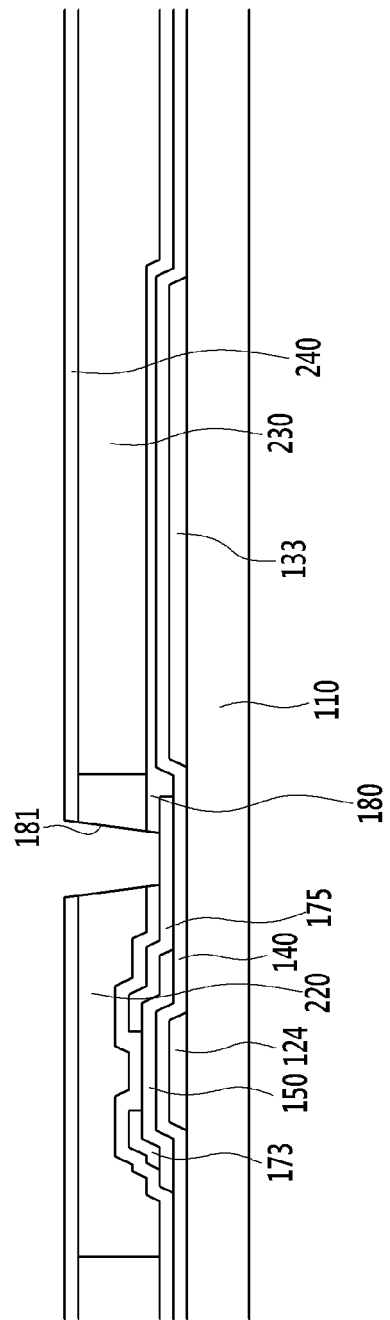
Figure 13:
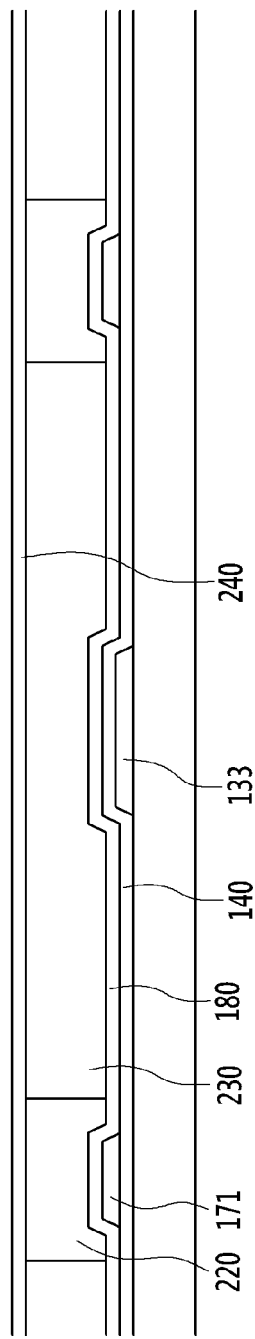

Referring to FIGS. 12 and 13, a passivation layer 180 is formed to cover a portion of the semiconductor layer 150 that is exposed by the source electrode 173 and the drain electrode 175; the passivation layer 180 also covers the source electrode 173 and the drain electrode 175. The passivation layer 180 may be made of an organic insulating material or an inorganic insulating material. The passivation layer 180 may have a single layer structure or a multilayer structure.

Next, a color filter 230 in each pixel area is formed on the passivation layer 180. Same-colored color filters 230 may be formed along a column direction of the plurality of pixel areas. In one or more embodiments, for forming three sets (or columns) of colored color filters 230, a set of first-colored color filters 230 is first formed, and then a mask is shifted to form a set of second-colored color filter 230. Subsequently, the set of second-colored color filters 230 is formed, and then the mask is shifted to form a set of third-colored color filters 230.

Next, a light blocking members 220 is formed on a boundary of each pixel area and the thin film transistor on the passivation layer 180.

In one or more embodiments, the color filter 230 is formed, and then the light blocking member 220 is formed. In one or more embodiments, the light blocking member 220 may be first formed, and then the color filter 230 may be formed.

Next, first insulating layers 240 made of an inorganic insulating material, such as at least one of silicon nitride (SiNx) and silicon oxide (SiOx), are formed on the color filter 230 and the light blocking member 220.

Next, a contact hole 181 is formed by etching the first insulating layer 240, the light blocking member 220, and the passivation layer 180 so that a part of the drain electrode 175 is exposed.

Figure 14:
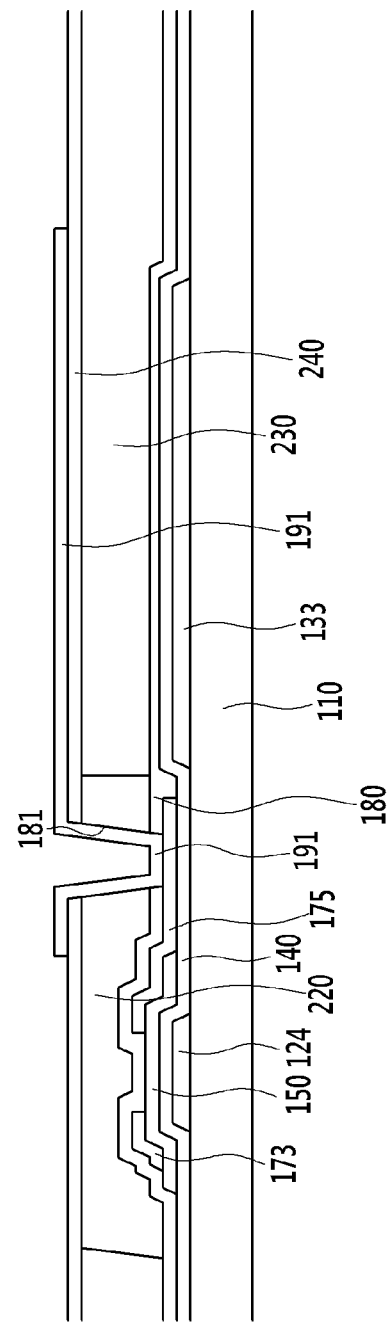
Figure 15:
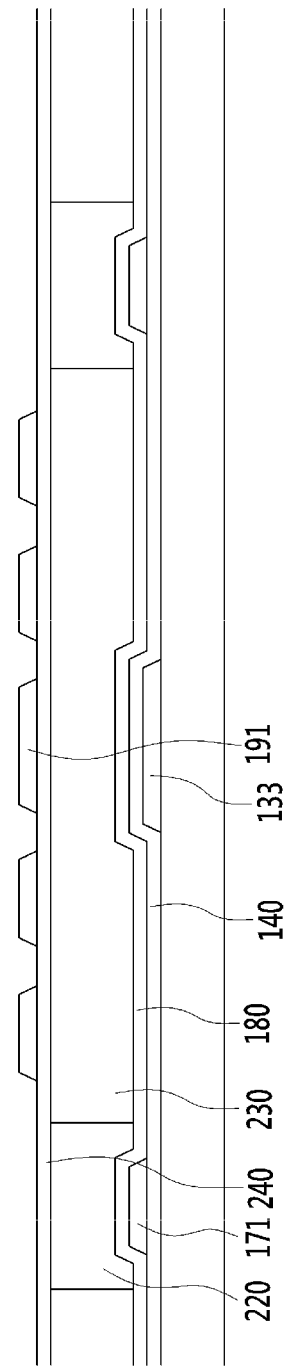

Referring to FIGS. 14 and 15, a transparent metal material, such as at least one of indium thin oxide (ITO) and indium zinc oxide (IZO), is deposited and then patterned on the first insulating layer 240 to form a pixel electrode 191 in the pixel area. The pixel electrode 191 is formed to be electrically connected with the drain electrode 175 through the contact hole 181.

Figure 16:
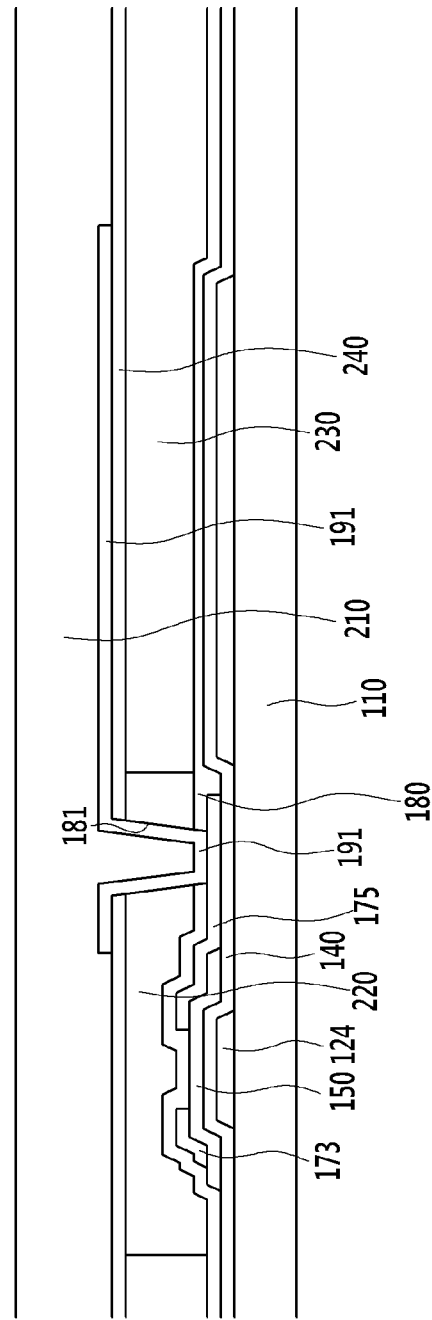
Figure 17:
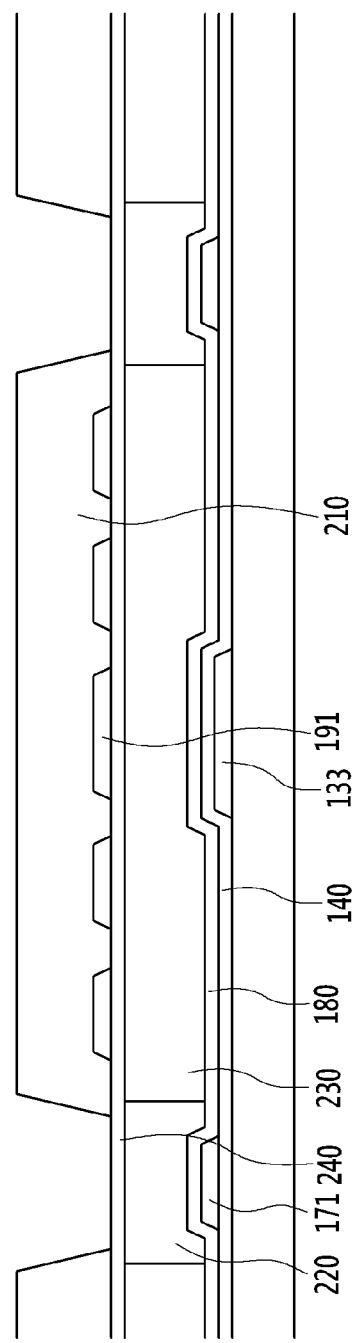

Referring to FIGS. 16 and 17, a sacrificial layer 210 made of an organic insulating material is formed on the pixel electrode 191 and the first insulating layer 240. The sacrificial layer 210 is patterned to include separated portions corresponding to pixel areas that are adjacent to each other in the first direction and to include continuous or connected portions along or corresponding to pixel areas that are adjacent to each other in the second direction. For example, the sacrificial layer 210 may be formed to include separated portions corresponding to pixel areas that are adjacent to each other in the gate line direction and to include continuous or connected portions along or corresponding to pixel areas that are adjacent to each other in the data line 171 direction. In one or more embodiments, portions of the sacrificial layer 210 that overlap the data lines 171 may be removed.

The sacrificial layer 210 may be made of a photosensitive polymer material and may be patterned by performing a photo process.

Figure 18:
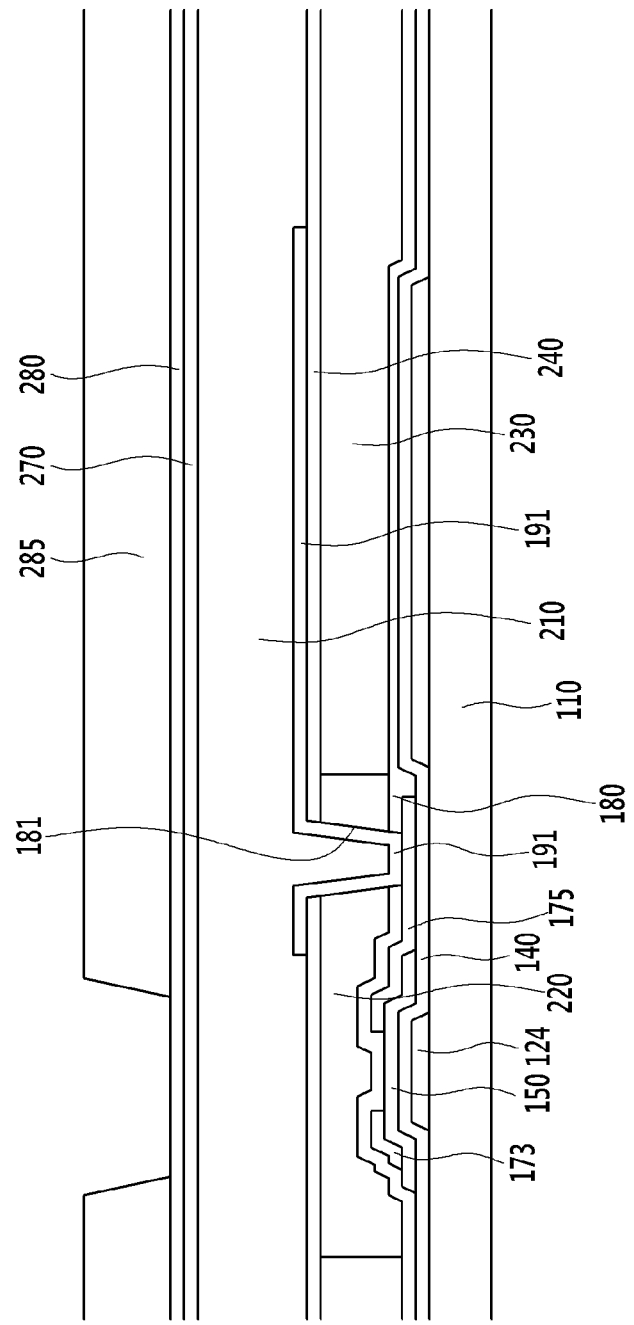
Figure 19:
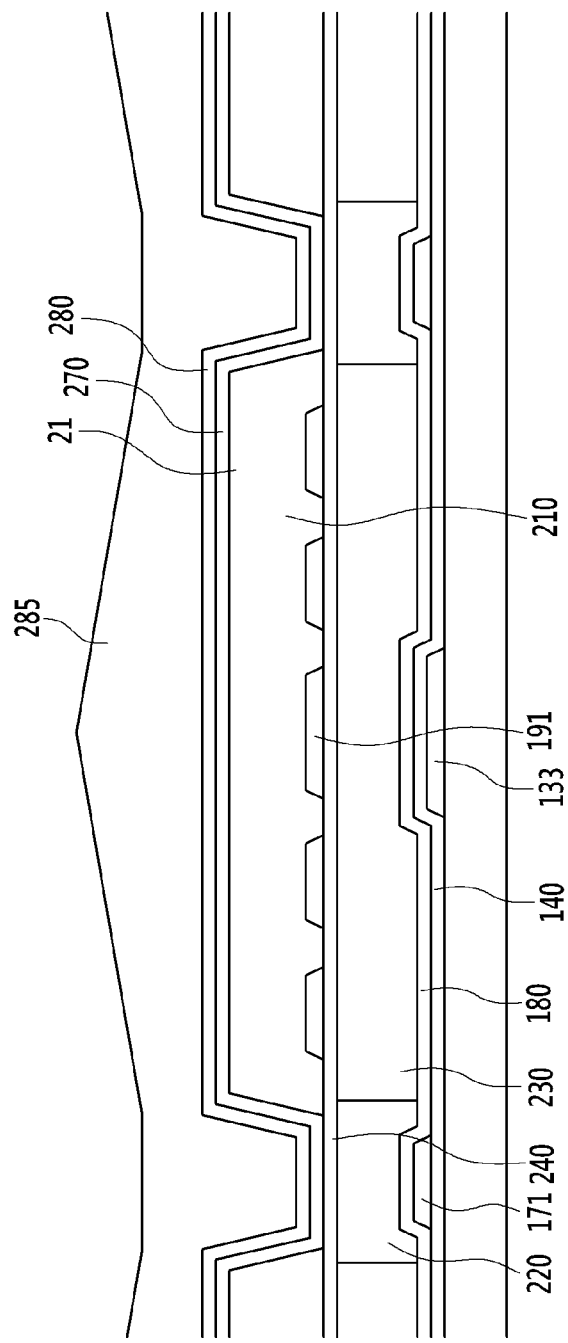
Figure 20:
FIG. 20 is a plan view illustrating a mask used for performing processes illustrated in FIGS. 18 and 19 according to one or more embodiments of the present invention.

Referring to FIGS. 18 and 19, a common electrode 270 is formed by depositing a metal material on the sacrificial layer 210.

Next, a second insulating layer 280 made of an inorganic insulating material, such as at least one of silicon oxide or silicon nitride, is formed on the common electrode 270.

Next, an organic layer 285 made of an organic material is formed on the second insulating layer 280. The upper surface of the organic layer 285 is formed to include one or more portions that are slanted with respect to the substrate 110 by pattering the organic layer 285. A height of the upper surface of the organic layer 285 may be gradually lowered toward left and right edges of the pixel area from the center of the pixel area. Accordingly, the upper surface of the organic layer 285 and the substrate 110 may gradually become closer toward the left and right edges of the pixel area from the center of the pixel area.

The upper surface of the organic layer 285 may include a flat portion that overlaps the data line 171. A portion of the organic layer 285 that overlaps the gate line may be removed.

The organic layer 285 may be patterned by using a mask 500 illustrated in FIG. 20. The mask 500 used for patterning the organic layer 285 includes a plurality of mask regions corresponding to each of the plurality of pixel areas on the substrate 110. FIG. 20 illustrates one mask region.

The mask region includes a plurality of transmissive portions 510 and a plurality of opaque portions 520. The plurality of opaque portions 520 has the same width, and the plurality of transmissive portions 510 has different widths. That is, the mask region includes multiple slits having different widths. The widths of the plurality of transmissive portions 510 are gradually widened toward both edges of the mask region from (near) the center of the mask region. A width t2 of a transmissive portion disposed at the second from the center is larger than a width t1 of a transmissive portion closest to a transmissive portion positioned at the center. Further, a width t3 of a transmissive portion disposed at the third from the center is larger than the width t2 of the transmissive portion disposed at the second from the center. A width t4 of a transmissive portion disposed at the fourth from the center, a width t5 of a transmissive portion disposed at the fifth therefrom, a width t6 of a transmissive portion disposed at the sixth therefrom, a width t7 of a transmissive portion disposed at the seventh therefrom are gradually widened.

When the mask 500 is positioned on the organic layer 285, exposed and then developed (or etched), the organic layer 285 disposed at the center of the pixel area which receives slight light is slightly developed (etched), and the organic layer 285 disposed at the edge of the pixel area which receives a large amount of light is much developed (or etched). Accordingly, a thickness of the organic layer 285 becomes gradually thinner toward the edge from the center of the pixel area.

An angle between the substrate 110 and the upper surface of the organic layer 285 may be controlled by controlling the widths of the transmissive portions. An angle between the substrate 110 and the upper surface of the organic layer 285 may be at least 1 degree and at most 10 degrees. In one or more embodiments, the angle between the substrate 110 and the upper surface of the organic layer 285 may be at least 1.5 degrees and at most 2 degrees.

Figure 21:
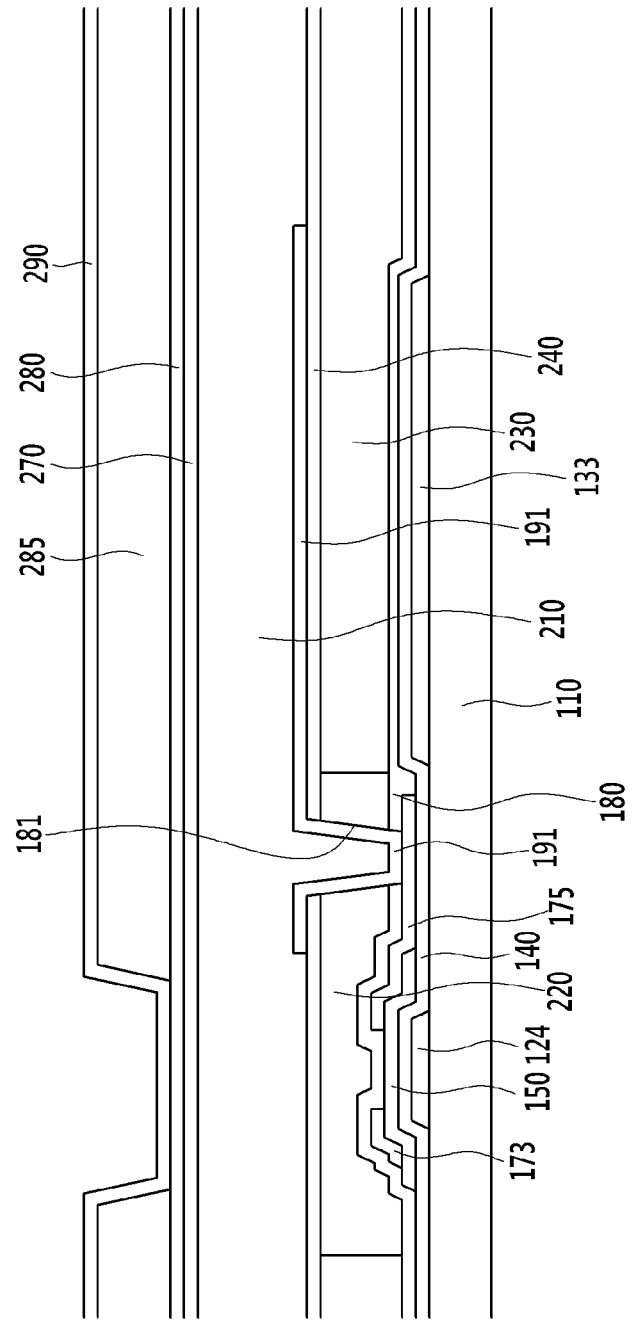
Figure 22:
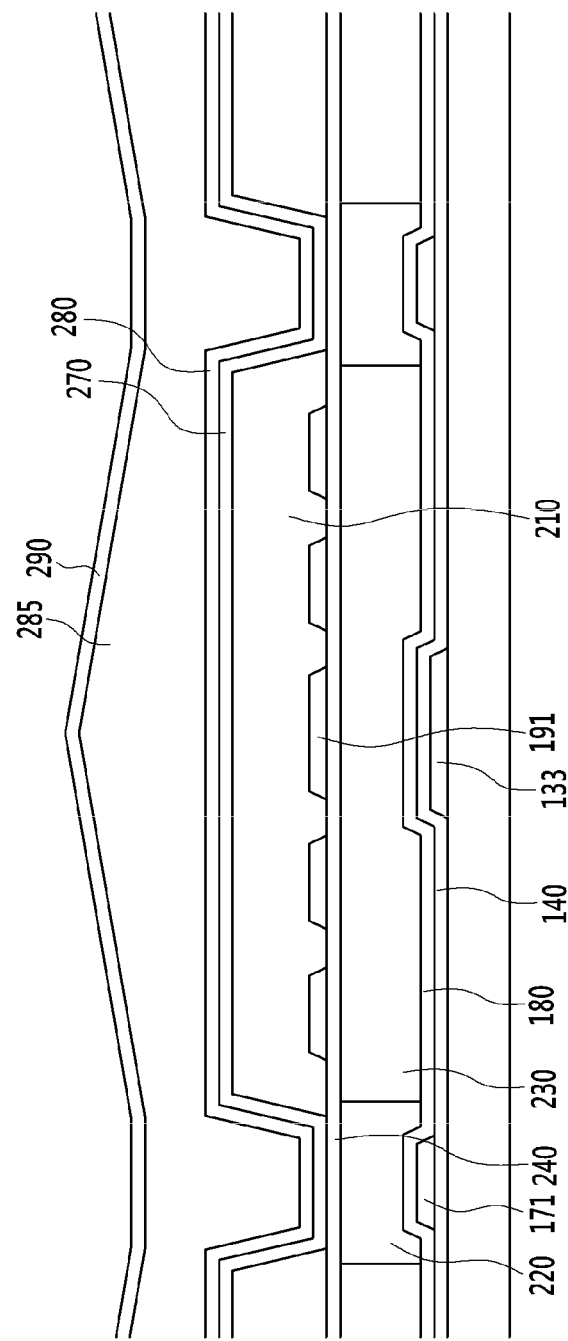
Figure 23:
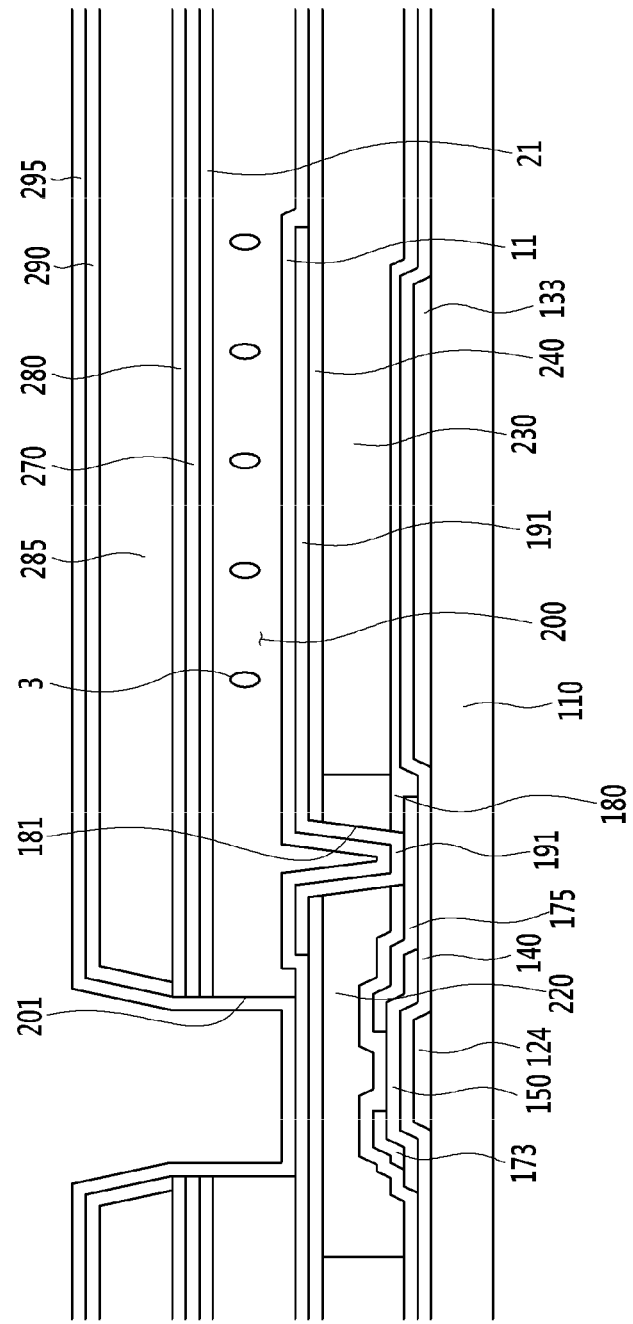
Figure 24:
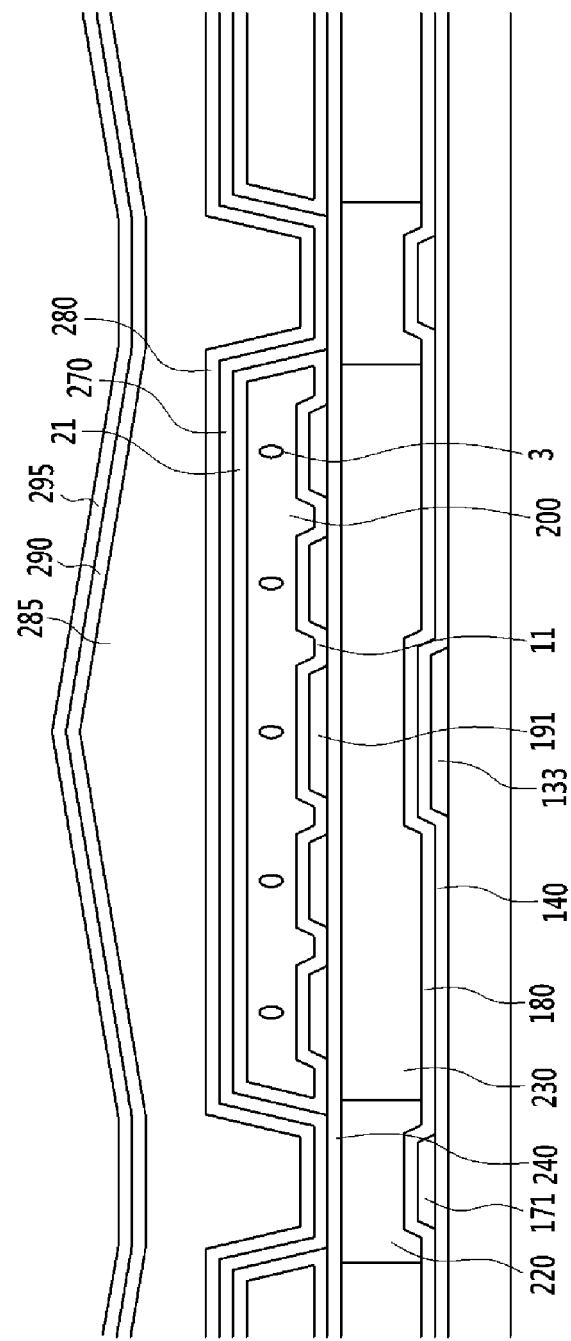

Referring to FIGS. 21 and 22, a third insulating layer 290 made of an inorganic insulating material, such as at least one of silicon nitride (SiNx) and silicon oxide (SiOx), is formed on the organic layer 285. Since the third insulating layer 290 is formed on the inclined organic layer 285, the third insulating layer 290 may be formed to include one or more potions that are slanted with respect to the substrate 110.

Referring to FIGS. 21, 22, 23, and 24, a portion of the third insulating layer 290, a portion of the second insulating layer 280, and a portion of the common electrode 270 that overlap the gate line are removed by pattering the third insulating layer 290, the second insulating layer 280, and the common electrode 270. Accordingly, the sacrificial layer 210 positioned below the remaining portion of the common electrode 270 is exposed.

Oxygen plasma is supplied for removing the sacrificial layer 210. Alternatively or additionally, the sacrificial layer 210 is fully removed by supplying a developing solution. After the sacrificial layer 210 has been removed, a space 200 is generated at a place where the sacrificial layer 210 was positioned The pixel electrode 191 and the common electrode 270 are spaced apart from each other with the space 200 disposed between the pixel electrode 191 and the common electrode 270.

The space 200 is exposed at an opening where the common electrode 270 is not formed. The opening is referred to as a liquid crystal injection hole 201. In one or more embodiments, the liquid crystal injection hole 201 is formed along the gate line. In one or more embodiments, the liquid crystal injection hole 201 may be formed along the data line 171.

Next, an aligning agent containing an alignment material may be dropped on the substrate 110 using a spin coating method or an inkjet method, and the aligning agent is injected into the space 200 through the liquid crystal injection hole 201. A curing process is performed after the aligning agent has been injected into the space 200, a solution component of the aligning agent is evaporated, and the alignment material is left on the wall surface in the space 200.

Accordingly, a first alignment layer 11 may be formed on the pixel electrode 191, and a second alignment layer 21 may be formed below the common electrode 270. The first alignment layer 11 and the second alignment layer 21 face each other, enclose the space 200, and connect with each other at the edge of the pixel area. The common electrode 270 has side walls that cover sides of the space 200 in a direction parallel to the data lines 171, and the alignment material is also disposed on the inner surfaces of the side walls.

In one or more embodiments, the alignment material of the first alignment layer 11 and the alignment material of second alignment layer 12, except the alignment material at the side of the space 200, are aligned in a direction vertical to the substrate 110. In one or more embodiments, a process of irradiating UV to the first and second alignment layers 11 and 12 is performed, and thus the alignment material may be aligned in a direction parallel to the substrate 110.

Next, a liquid crystal material 3 including liquid crystal molecules may be dropped on the substrate 110 using an inkjet method or a dispensing method, and the liquid crystal material 3 is injected into the space 200 through the liquid crystal injection hole 201. In one or more embodiments, the liquid crystal material 3 may drop into the liquid crystal injection holes 201 formed along an odd numbered gate line and may not drop into the liquid crystal injection holes 201 formed along an even numbered gate line. In one or more embodiments, the liquid crystal 3 may drop into the liquid crystal injection holes 201 formed along an even numbered gate line and may not drop into the liquid crystal injection holes 201 formed along an odd numbered gate line.

When the liquid crystal 3 drops into a liquid crystal injection hole 201 formed along an odd numbered gate line, the liquid crystal 3 may enter into space 200 through the liquid crystal injection hole 201 according to a capillary force. In one or more embodiments, air in the space 200 is discharged through a liquid crystal injection hole 201 formed along an even numbered gate line, such that the liquid crystal 3 may enter into the space 200 with minimum resistance.

Next, an overcoat 295 is formed by depositing a material that does not (chemically) react with the liquid crystal material 3 on the third insulating layer 290. The overcoat 295 is formed to cover the liquid crystal injection hole 201, thereby sealing the space 200 for each pixel area. The overcoat 295 may be made of a material that does not (chemically) react with the liquid crystal material 3, such as perylene.

In one or more embodiments, the overcoat 295 may be formed to planarize the substrate 110. Alternatively or additionally, an additional organic insulator may be formed on the overcoat 295 to planarize the substrate 110.

In one or more embodiments, the overcoat 295 may be formed by dropping the material that does not react with the liquid crystal 3 on the third insulating layer 290 using an inkjet method and then curing the material.

In one or more embodiments, the overcoat 295 may be formed by adhering a film-shaped material onto the third insulating layer 290.

While this invention has been described in connection with what is presently considered to be practical exemplary embodiments, it is to be understood that the invention is not limited to the disclosed embodiments. The invention is intended to cover various modifications and equivalent arrangements included within the spirit and scope of the appended claims.

<Description of symbols>

| | |
|---|---|
| 3: Liquid crystal material | 11: First alignment layer |
| 21: Second alignment layer | 121: Gate line |
| 124: Gate electrode | 133: Storage electrode |
| 140: Gate insulating layer | 150: Semiconductor layer |
| 171: Data line | 173: Source electrode |
| 175: Drain electrode | 180: Passivation layer |
| 181: Contact hole | 191: Pixel electrode |
| 192: Vertical stem (electrode) | 193: Horizontal stem (electrode) |
| 194a: First minute branch | 194b: Second minute branch |
| 194c: Third minute branch | 194d: Fourth minute branch |
| 200: Space | 201: Liquid crystal injection hole |
| 210: Sacrificial layer | 220: Light blocking member |
| 225: Fourth insulating layer | 230: Color filter |
| 240: First insulating layer | 270: Common electrode |
| 280: Second insulating layer | 285: Organic layer |
| 290: Third insulating layer | 295: Overcoat |

| <Description of symbols> | |
|---|---|
| 500: Mask | 510: Transmissive portion |
| 520: Opaque portion | |

What is claimed is:

1. A display device, comprising:
a substrate including a plurality of pixel areas;
a thin film transistor formed on the substrate;
a first electrode connected to the thin film transistor to be formed in the pixel area;
an organic layer formed on the first electrode to be spaced apart from the first electrode with a plurality of cavities interposed therebetween;
a liquid crystal layer filling the cavities; and
an overcoat formed on the organic layer so as to seal the cavities,
wherein a height of the center of the pixel area of the organic layer is higher than heights of both edges of the pixel area of the organic layer.

2. The display device of claim 1, wherein:
the organic layer is connected along the adjacent pixel areas in a first direction among the pixel areas.

3. The display device of claim 1, wherein:
the upper surface and a part of the side of the space are surrounded by the organic layer.

4. The display device of claim 1, further comprising:
a second electrode formed to be spaced apart from the first electrode,
wherein the second electrode
is formed to cover the upper surface and a part of the side of the space, and
is connected along the adjacent pixel areas in the first direction among the pixel areas.

5. The display device of claim 1, further comprising:
a second electrode formed to be spaced apart from the first electrode,
wherein the second electrode
is formed below the space, and
the first electrode and the second electrode have rod shapes, and the plurality of first electrodes and second electrodes are alternately arranged in one pixel area.

6. The display device of claim 1, wherein:
the upper surface of the organic layer and the substrate is gradually closer toward both edges of the pixel area from the center of the pixel area.

7. The display device of claim 1, wherein:
an angle between the substrate and the upper surface of the organic layer is 1 degree or more and 10 degrees or less.

8. The display device of claim 7, wherein:
an angle between the substrate and the upper surface of the organic layer is 1.5 degrees or more and 2 degrees or less.

9. The display device of claim 1, further comprising:
a color filter formed below the first electrode.

10. The display device of claim 1, wherein:
a height of the upper surface of a color filter formed below the first electrode
is gradually lowered toward both edges of the pixel area from the center of the pixel area.

11. The display device of claim 10, further comprising:
a light blocking member formed on a boundary of the pixel area and the thin film transistor.

12. The display device of claim 10, wherein:
the color filters are overlapped with each other on the boundary of the pixel area and the thin film transistor.

13. The display device of claim 1, wherein:
the organic layer includes
a color filter formed in the pixel area; and
a light blocking member formed on a boundary of the pixel area and the thin film transistor.

14. The display device of claim 13, further comprising:
an insulating layer formed below the first electrode and made of an organic insulating material.

15. A display device, comprising: a substrate including a plurality of pixel areas; a thin film transistor formed on the substrate; a first electrode connected to the thin film transistor to be formed in the pixel area; a color filter formed on the first electrode to be spaced apart from the first electrode with a plurality of cavities interposed therebetween; a liquid crystal layer filling the cavities; and an overcoat formed on the color filter so as to seal the cavities, wherein a height of the center of the pixel area of the color filter is higher than heights of both edges of the pixel area of the color filter.

16. The display device of claim 15, wherein:
the upper surface of the color filter and the substrate is gradually closer toward both edges of the pixel area from the center of the pixel area, and
an angle between the substrate and the upper surface of the organic layer is 1 degree or more and 10 degrees or less.

17. The display device of claim 15, further comprising:
an insulating layer formed below the first electrode and made of an organic insulating material,
wherein the upper surface of the insulating layer and the substrate is gradually closer toward both edges of the pixel area from the center of the pixel area.

* * * * *